United States Patent
Komatsu et al.

(10) Patent No.: US 10,020,662 B2
(45) Date of Patent: *Jul. 10, 2018

(54) ELECTRIC STORAGE APPARATUS, ELECTRONIC DEVICE, ELECTRIC VEHICLE, AND ELECTRIC POWER SYSTEM

(71) Applicant: Sony Corporation, Tokyo (JP)

(72) Inventors: Yoshihiro Komatsu, Kanagawa (JP); Hidekazu Kikuchi, Kanagawa (JP); Koji Umetsu, Miyagi (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/608,106

(22) Filed: May 30, 2017

(65) Prior Publication Data

US 2017/0264111 A1    Sep. 14, 2017

Related U.S. Application Data

(63) Continuation of application No. 13/592,950, filed on Aug. 23, 2012, now Pat. No. 9,705,341.

(30) Foreign Application Priority Data

Aug. 31, 2011   (JP) ................................. 2011-189561
Aug. 31, 2011   (JP) ................................. 2011-189563

(51) Int. Cl.
*B60L 11/18*   (2006.01)
*H01F 38/30*   (2006.01)
(Continued)

(52) U.S. Cl.
CPC ......... *H02J 7/0019* (2013.01); *B60L 11/1866* (2013.01); *H01F 38/30* (2013.01);
(Continued)

(58) Field of Classification Search
None
See application file for complete search history.

(56) References Cited

U.S. PATENT DOCUMENTS

2002/0074985 A1   7/2002  Matsui et al.
2008/0211457 A1   9/2008  Rudorff et al.
(Continued)

FOREIGN PATENT DOCUMENTS

| CN | 102904295 A | 1/2013 | |
|---|---|---|---|
| EP | 0432639 B1 * | 12/1989 | ......... G01R 31/3658 |

(Continued)

OTHER PUBLICATIONS

Kamjanapiboon, Chamyut; Jiraereeamomkul, Kaman; Monyakul, Veerapol; "High Efficiency Battery Management System for Serially Connected Battery String" Jul. 2009, IEEE, Industrial Electronics, IEEE International Symposium on, pp. 1504-1509.

(Continued)

*Primary Examiner* — Jared Fureman
*Assistant Examiner* — Joel Barnett
(74) *Attorney, Agent, or Firm* — K&L Gates LLP

(57) ABSTRACT

A battery system includes a plurality of electronic storage modules serially connected together wherein the electronic storage modules include a battery block group including a plurality of battery cells, and a different magnetic core connected to each battery block group.

20 Claims, 30 Drawing Sheets

(51) Int. Cl.
  *H01M 10/625* (2014.01)
  *H01M 2/02* (2006.01)
  *H02J 7/00* (2006.01)

(52) U.S. Cl.
  CPC ......... *H01M 2/024* (2013.01); *H01M 10/625* (2015.04); *H02J 7/0021* (2013.01)

(56) References Cited

U.S. PATENT DOCUMENTS

| | | | |
|---|---|---|---|
| 2009/0263705 A1 | 10/2009 | Anantharaman | |
| 2011/0309795 A1* | 12/2011 | Firehammer | H02J 7/0014 320/118 |
| 2013/0026991 A1* | 1/2013 | Roessler | H02J 7/0016 320/116 |

FOREIGN PATENT DOCUMENTS

| | | |
|---|---|---|
| EP | 0432639 A2 | 6/1991 |
| JP | H10-52042 A | 2/1998 |
| JP | H11-113183 A | 4/1999 |
| JP | 2000-014031 A | 1/2000 |
| JP | 2002-125325 A | 4/2002 |
| JP | 2002-223528 A | 8/2002 |
| JP | 2008-035680 A | 2/2008 |
| JP | 2008-271708 A | 11/2008 |
| WO | 2010/144399 A2 | 12/2010 |

OTHER PUBLICATIONS

Japanese Office Action dated Apr. 30, 2014 in connection with Japanese application No. 2011-189563 (6 pages).
Japanese Office Action dated Apr. 30, 2014 in connection with Japanese application No. 2011-189561 (7 pages).
Japanese Office Action dated Jul. 22, 2014 in connection with Japanese application No. 2011-189563.
Japanese Office Action dated Jul. 22, 2014 in connection with Japanese application No. 2011-189561.
Japanese Office Action dated Nov. 18, 2014 in connection with Japanese application No. 2014-213500 (4 pages).
Chinese Office Action (with English translation) dated Oct. 19, 2015 in connection with Chinese application No. 201210306918.X (30 pages).
Chinese Office Action (with English translation) dated Oct. 8, 2016 in connection with Chinese application No. 201210306918.X (12 pages).

* cited by examiner

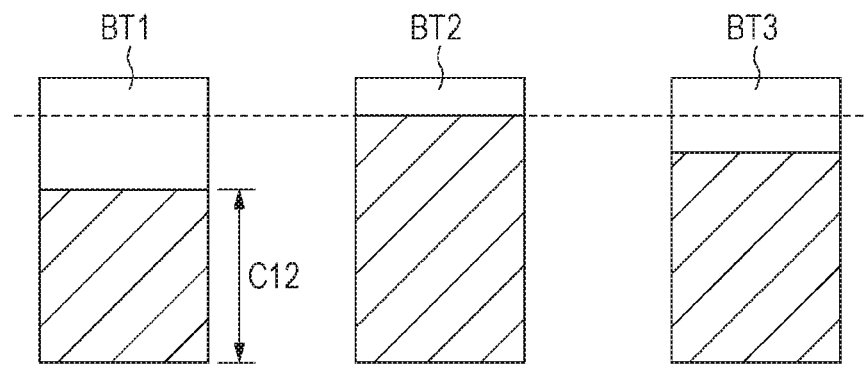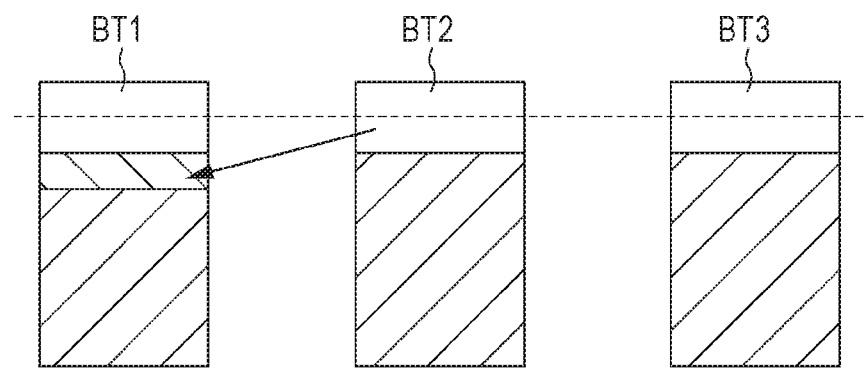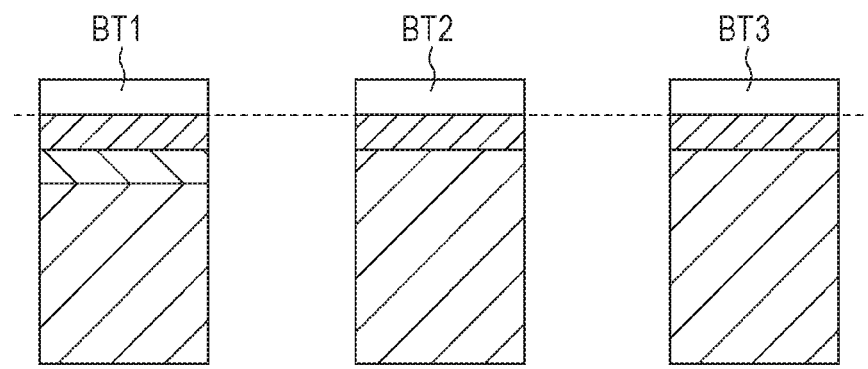

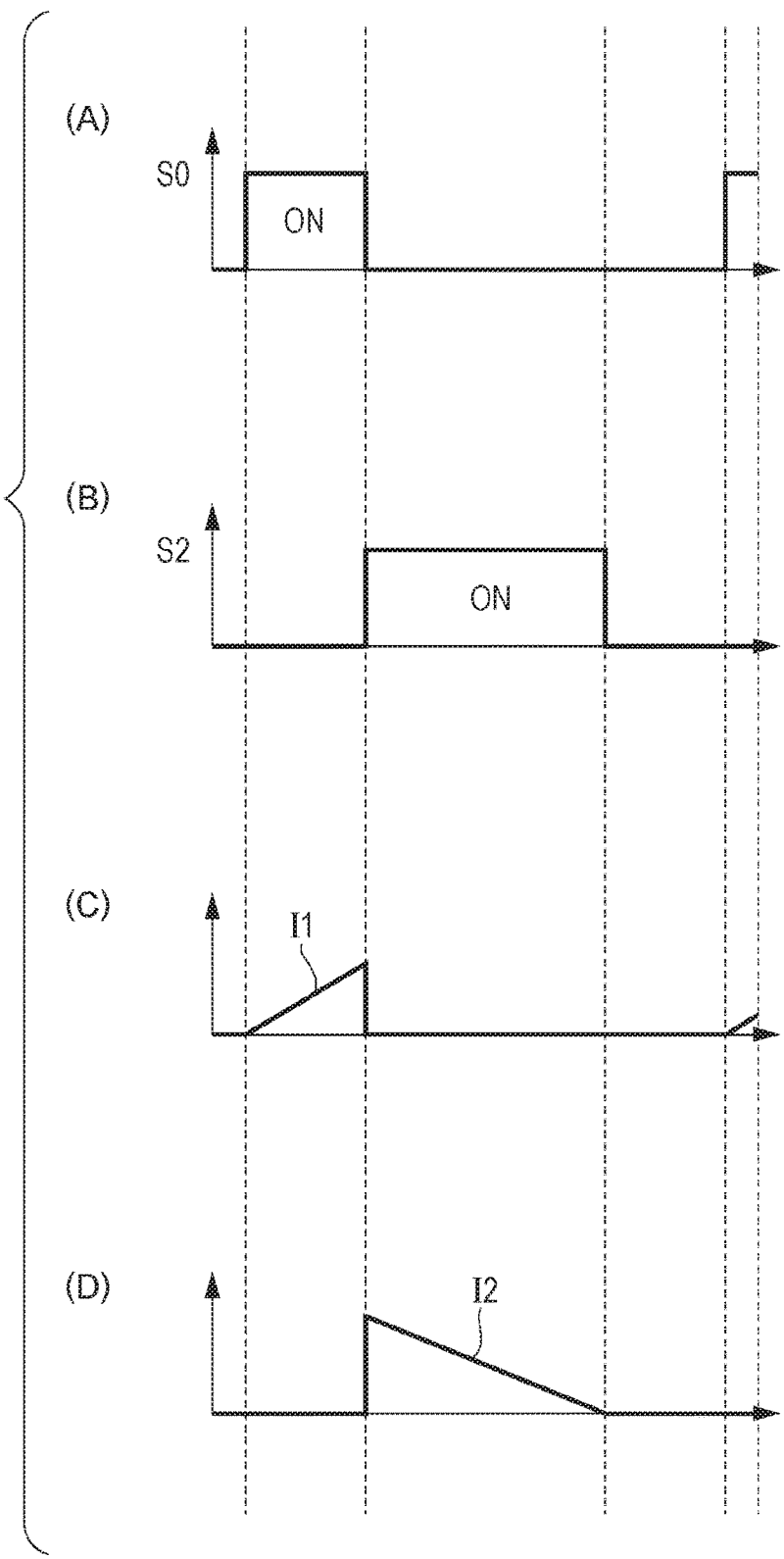

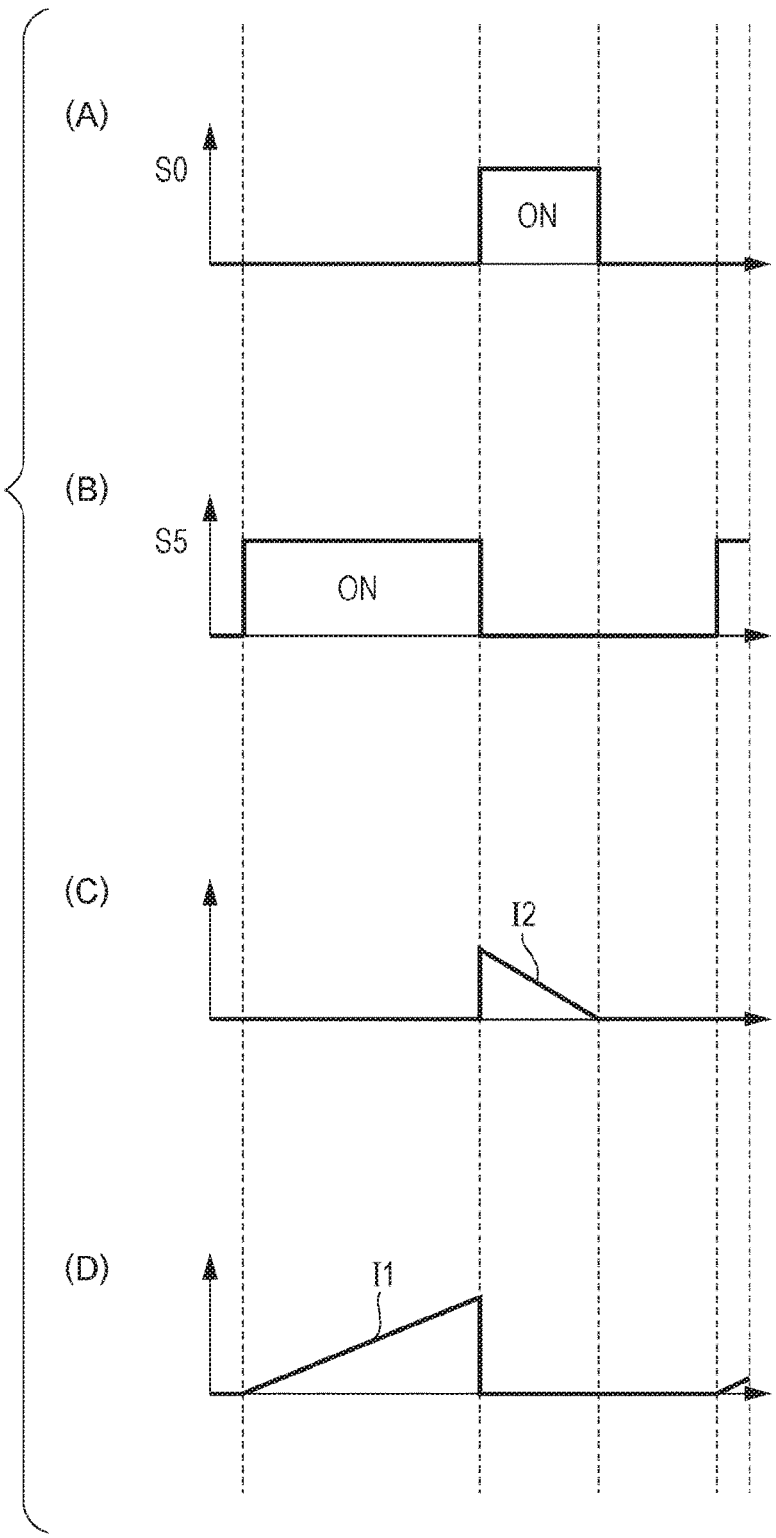

ELECTRIC STORAGE APPARATUS, ELECTRONIC DEVICE, ELECTRIC VEHICLE, AND ELECTRIC POWER SYSTEM

CROSS-REFERENCE TO RELATED APPLICATIONS

The present application is a continuation of U.S. application Ser. No. 13/592,950, filed Aug. 23, 2012, which claims priority to Japanese Application No. 2011-189563, filed Aug. 31, 2011, and claims priority to Japanese Application No. 2011-189561, filed Aug. 31, 2011, the disclosures of which are hereby incorporated by reference.

BACKGROUND

The present disclosure relates to an electric storage apparatus, and an electronic device, an electric vehicle, and an electric power system taking advantage of electric power from the electric storage apparatus.

In recent years, uses for secondary batteries such as lithium-ion batteries and so forth have rapidly been expanded in electric power storage apparatuses for electric power storage, automotive batteries, and so forth combined with a new energy system such as solar batteries, wind-power generation, or the like. In the case of employing a great number of electric storage elements, e.g., unit batteries (also referred to as single batteries or cells. In the following description, referred to as battery cells as appropriate) to generate large output, a configuration is employed wherein multiple electric storage modules are serially connected. With the electric storage modules, a battery block is configured by multiple, e.g., four battery cells being connected in series and/or parallel. An electric storage module (also referred to as assembled battery) is configured by a great number of battery blocks being housed in an exterior case.

Further, there is a battery system according to the related art wherein multiple electric storage modules are connected, and a common control device is provided to the multiple electric storage modules. The electric storage modules include a module controller, and configured to communicate between the module controller and a control device via a communication tool.

In the case of using multiple battery cells, there may be a case where even if one of multiple battery cells has reached use lower limit voltage at the time of discharge due to difference in self-discharge of battery cells, or the like, other battery cells have not reached use lower limit voltage yet. Charging the battery cells again in such a state causes a problem in that a battery cell which is not sufficiently charged occurs, and the capability of the battery cell fails to be sufficiently be exhibited.

In order to correct such irregularities between multiple battery cells, balance between the battery cells has heretofore been controlled. Further, with Japanese Unexamined Patent Application Publication No. 2008-035680, description has been made wherein a great number of battery cells are divided into multiple series cell groups, an inter-cell voltage balance correction circuit is provided to the cell groups, and also an inter-group voltage balance correction circuit is provided thereto. The inter-group voltage balance correction circuits are configured to subject the series voltages of the cell groups to balance correction using AC coupling to be formed with a transformer coil and a switching circuit.

SUMMARY

The inter-group voltage balance correction circuit described in Japanese Unexamined Application Publication No. 2008-035680 can be applied to the balance correction of the battery groups of an electric storage module. However, though a coil is connected for each cell group, the coils are configured to be wound on a common magnetic core. Accordingly, in the case that the coils have been connected to multiple electric storage modules housed in a separate case, the coils and magnetic core have to be housed in a separate case. A star-shaped wiring is performed wherein multiple electric storage modules are connected to the separate transformer devices, and consequently, a problem is caused in that in the case of the number of the electric storage modules increasing, connections are complicated.

Further, uniformity of voltages is performed by the switching circuit being controlled so as to perform an on/off operation at the same phase, which prevents a switching operation from being independently controlled for each cell group. Accordingly, this causes a problem in that transfer of electric power is not performed from a particular cell group having high voltage to a particular cell group having low voltage.

It has been found to be desirable to provide an electric storage apparatus, an electronic device, an electric vehicle, and an electric power system, whereby the switching operation of each electric storage module can individually be controlled without the transformer being configured as a device separate from the electric storage modules.

In one embodiment, a battery system includes: a plurality of electronic storage modules serially connected together, each electronic storage module including a battery block group including a plurality of battery cells, and a different magnetic core connected to each battery block group.

In another embodiment, a battery device includes: an electric storage module including a battery block group including a plurality of battery cells, and a magnetic core connected to the battery block group and configured to operate with only the one battery block group.

In another embodiment, a control device includes: an electric storage module including a magnetic core, a primary switch electrically connected to the magnetic core via a primary side coil, a secondary switch electrically connected to the magnetic core via a secondary side coil, and a module controller.

In another embodiment, an electric vehicle includes: battery system including a plurality of electronic storage modules serially connected together, each electronic storage module including a battery block group including a plurality of battery cells, and a different magnetic core connected to each battery block group; and a converter configured to receive a supply of electric power from the battery system, and to supply the power to a component of the electric vehicle.

Additional features and advantages are described herein, and will be apparent from the following Detailed Description and the figures.

BRIEF DESCRIPTION OF THE FIGURES

FIGS. 14A through 14C are approximate line drawings for describing an active top cell balance operation;

FIG. 16 is a timing chart for describing the operation of the active bottom cell balance circuit according to the related art;

FIG. 18 is a timing chart for describing the operation of the active top cell balance circuit according to the related art;

DETAILED DESCRIPTION

Embodiments of the present application will be described below in detail with reference to the drawings.

Embodiments that will be described below are preferred specific examples of the present disclosure, and technically preferred various restrictions are appended thereto, but the scope of the present disclosure will not be restricted to these embodiments in the following description unless description is made to the effect that the present disclosure is particularly restricted.

Electric Storage System

In the case of employing a great number of electric storage elements, e.g., battery cells to generate large output, a configuration is employed wherein multiple electric storage units (hereafter, referred to as electric storage modules) are connected thereto, and a control device is provided common to the multiple electric storage modules. Such a configuration will be referred to as an electric storage system.

Figure 1:
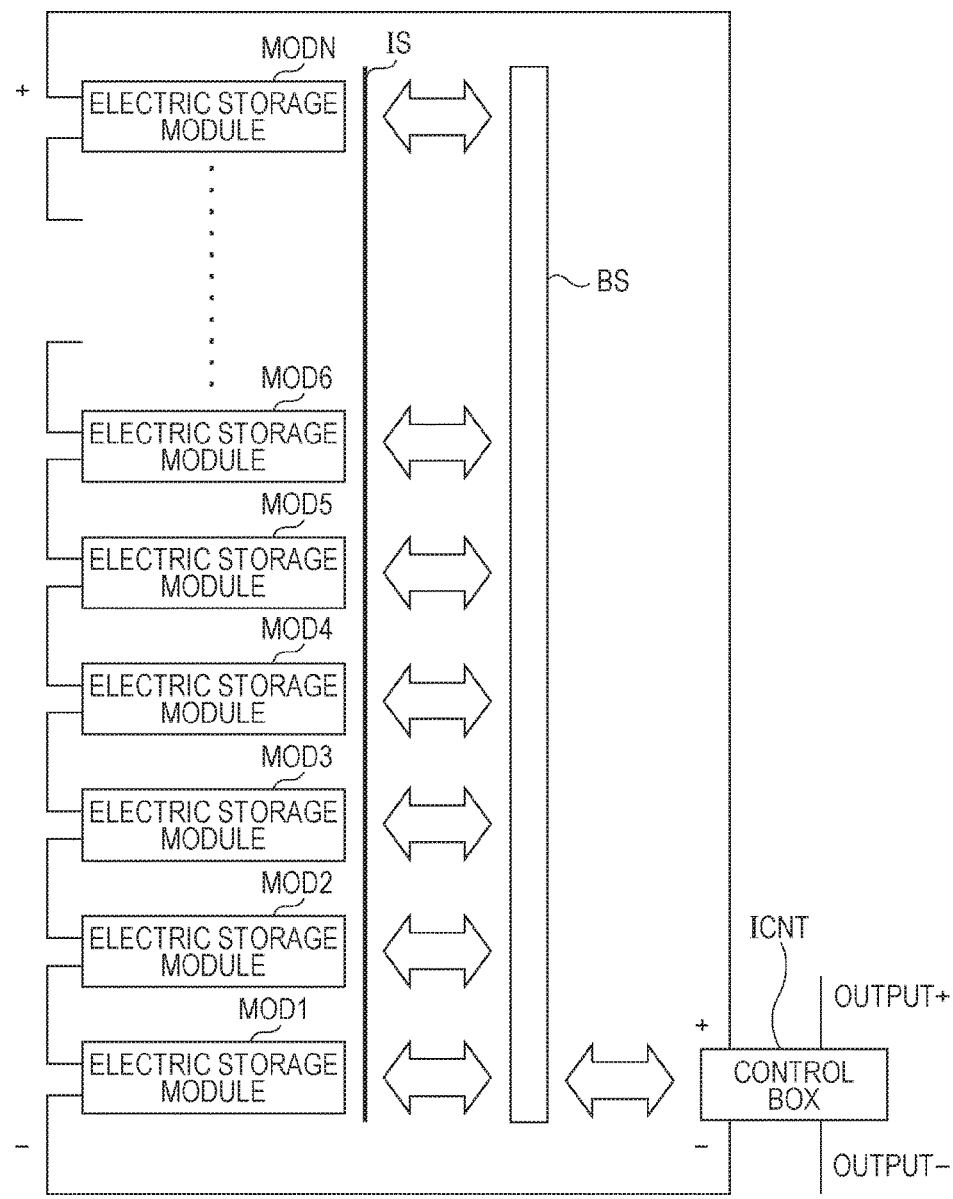
FIG. 1 is a block diagram of an example of an electric storage system.

The electric storage modules are units of multiple battery cells and controllers being combined. As illustrated in FIG. 1, N electric storage modules MOD1 through MODN are serially connected. The electric storage modules MOD1 through MODN are connected to an interface bus BS via an insulating unit IS.

Further, the module controllers are connected to the entire control device (hereafter, referred to as control box as appropriate) ICNT, and the control box ICNT performs management for such as charge management, discharge management, deterioration control, and so forth. The control box ICNT is configured of a microcomputer.

A serial interface is employed as a bus within an electric storage module, and a bus BS which connects the electric storage modules MOD1 through MODN, and the control box ICNT. Specifically, an SM bus (System Management Bus), a CAN (Controller Area Network), an SPI (Serial Peripheral Interface), or the like is employed as a serial interface. For example, an I2C bus can be employed. The I2C bus is synchronous serial communication for performing communication using two signal lines of SCL (serial clock) and two-way SDA (serial data).

The module controller CNT of each electric storage module MOD, and the control box ICNT perform communication. Specifically, information of an internal state of each electric storage module, i.e., battery information is received by the control box ICNT, the charging processing and discharging processing of each electric storage module are managed. The control box ICNT supplies output (N☐51.2 V) of series connection of the N electric storage modules to a load. In the case of N=14, the output becomes (14☐51.2 V=716.8 V).

Example of Electric Storage Modules

Figure 2:
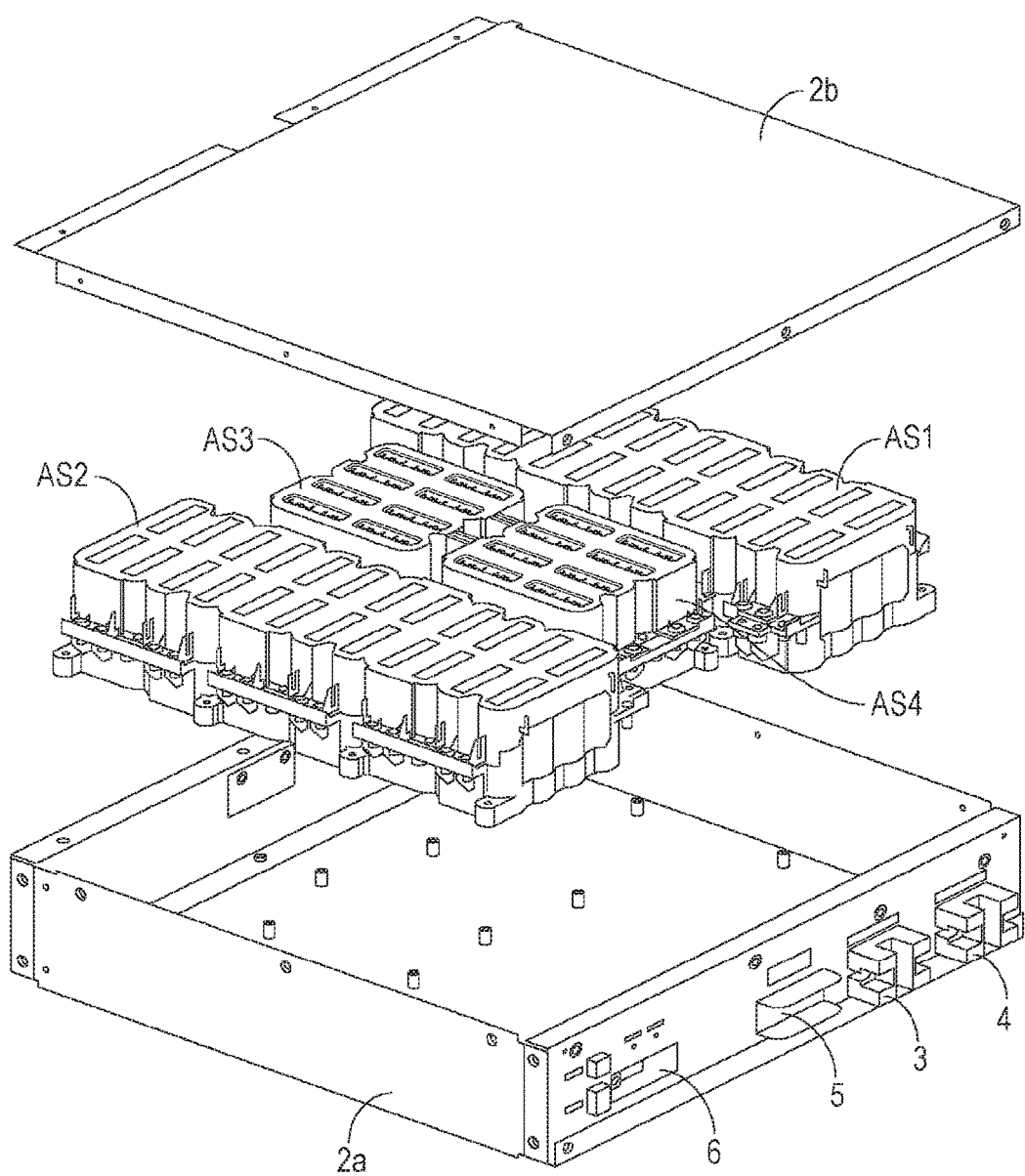
FIG. 2 is an exploded perspective view of an example of an electric storage module.

FIG. 2 is a perspective view illustrating the mechanical configuration of an electric storage module MOD. The exterior case of the electric storage module MOD is made up of an exterior lower case 2a and an exterior upper case 2b which are made of metal subjected to sheet metal processing. It is desirable to employ a material having high thermal conductivity and emissivity as a material of the exterior lower case 2a and exterior upper case 2b. Thus, an excellent casing heat dissipation property can be obtained, and temperature rise within the case can be prevented. For example, the materials of the exterior lower case 2a and exterior upper case 2b are aluminum or aluminum alloy or copper or copper alloy. An external positive pole terminal 3 and an external negative pole terminal 4 for charging/discharging as to the electric storage module MOD are provided to the back surface of the case.

Further, a current shielding vessel 5 is provided to the back surface of the electric storage module MOD. Safety can be improved by providing the current shielding vessel 5. Further, a connector unit 6 for communication with the control circuit disposed in the case 2 is provided. The control circuit is provided to monitor the temperature of a battery unit, and to control charging, discharging, and so forth. Further, a display element such an LED or the like indicating an operation state is provided to the front surface of the case.

The exterior lower case 2a of the case has a box-shaped configuration, and the exterior upper case 2b is provided so as to cover an opening thereof. Sub modules AS1 through AS4 are housed in the storage space of the exterior lower case 2a. In order to fix the sub modules AS1 through AS4 using a screw or the like, multiple bosses are formed on the bottom of the exterior lower case 2a. The sub modules AS1 through AS4 are assembled outside of the case beforehand.

Each sub module is a module of multiple battery blocks being integrated with an insulating case serving as a sub storage case. A mold component such as plastic or the like can be employed as the cases of the sub modules. The sub modules AS1 through AS4 are for housing the multiple battery blocks in the case so as to prevent the positive pole terminals and negative pole terminals of the internal battery blocks from being exposed.

One battery block is a block made up of eight cylindrical lithium-ion secondary batteries being connected in parallel, for example. The sub modules AS1 and AS2 are six battery blocks being integrated with the upper case and lower case, respectively. The sub modules AS3 and AS4 are two battery blocks being integrated with the upper case and lower case, respectively. Accordingly, a total of sixteen (6+6+2+2=16) battery blocks are used. These battery blocks are connected in series, for example.

With each of the sub modules AS1 through AS4, a metal plate for connection, e.g., a bus bar is used for serially connecting battery blocks. The bus bar is an elongated rod-shaped metal. With the bus bar, multiple holes for connecting a connection metal plate derived from a battery block, or the like are formed.

Figure 3:
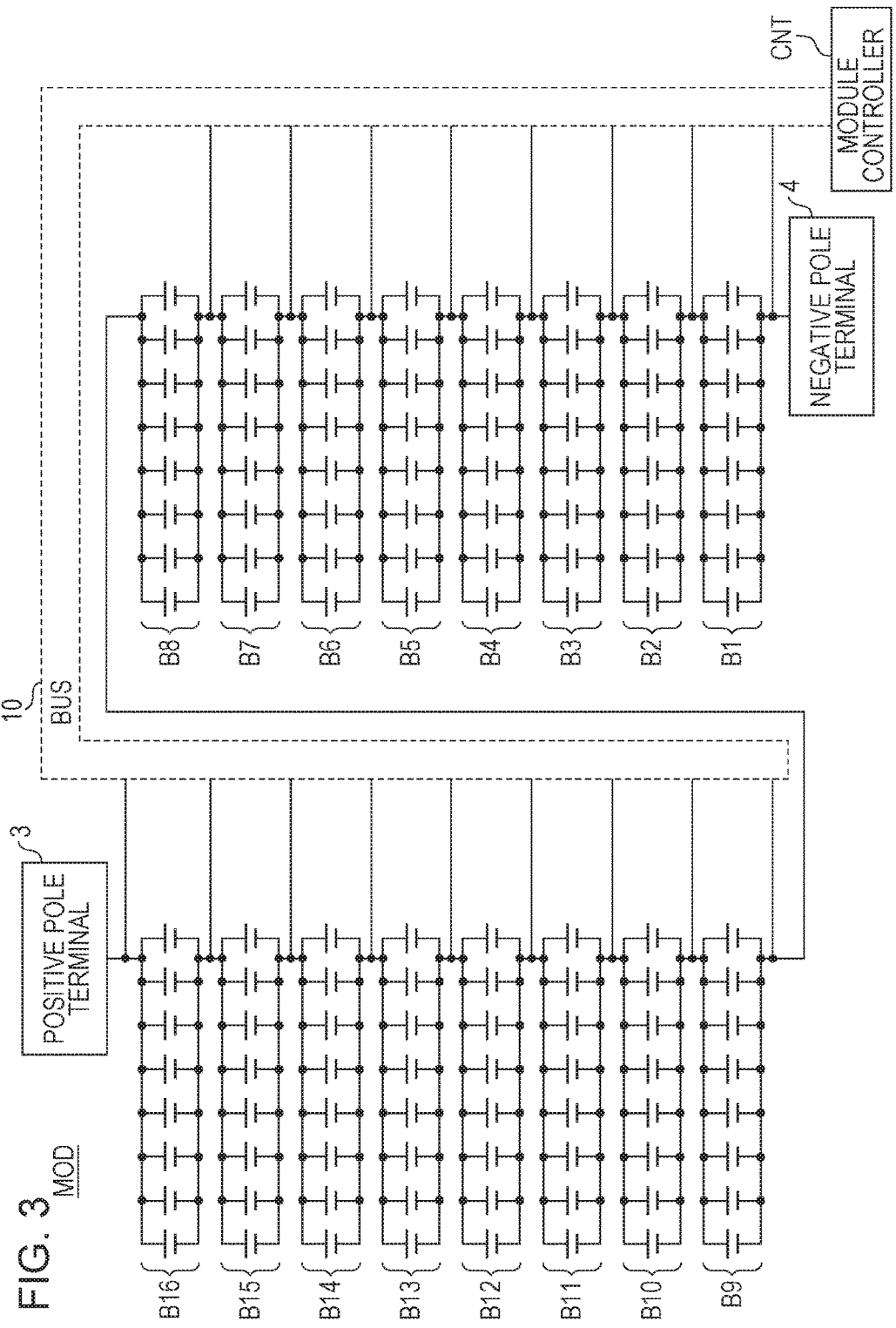
FIG. 3 is a connection diagram illustrating the connection configuration of an example of the electric storage module.

As illustrated in FIG. 3, battery blocks B1 through B16 to each of which eight batteries are connected in parallel are serially connected. The battery blocks B1 through B16 are each connected to a module controller CNT serving as a control device of each electric storage module, and charging/discharging is controlled. Charging/discharging is performed via the exterior positive pole terminal 3 and exterior negative terminal 4. For example, the battery blocks B1 through B6 are included in the sub module AS1, and the battery blocks B11 and B16 are included in the sub module AS2. Further, the battery blocks B7 and B10 are included in the sub module AS3, and the battery blocks B8 and B9 are included in the sub module AS4.

Information such as voltage between the positive and negative electrodes of each battery block, or the like, is supplied to the module controller CNT via the bus 10. The module controller CNT monitors the voltage, current, and temperature of each battery block, and outputs a monitored result as battery information. For example, one electric storage module MOD outputs (16☐3.2 V=51.2 V).

Figure 4:
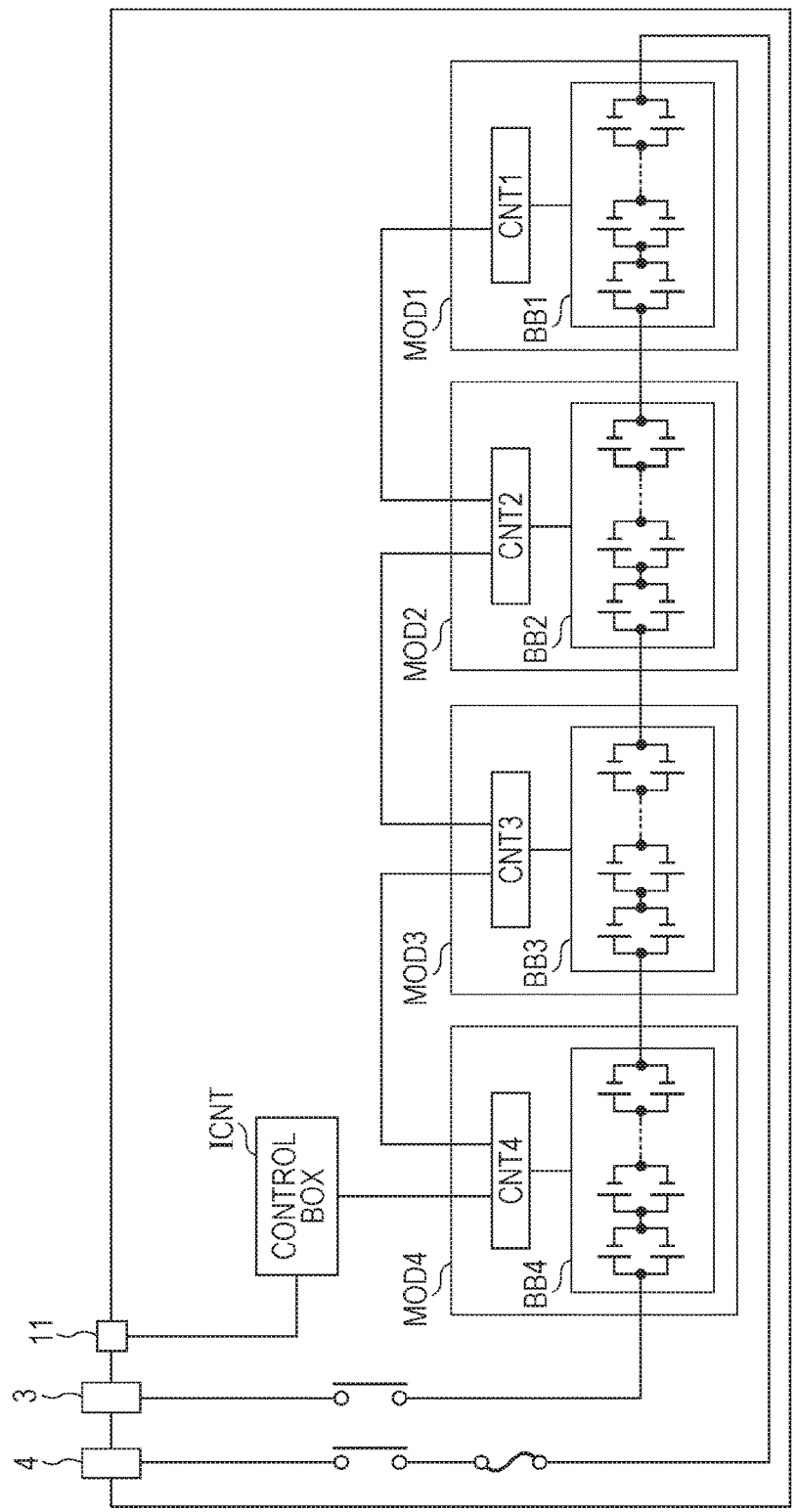
FIG. 4 is a block diagram illustrating a specific configuration of the electric storage system.

FIG. 4 illustrates a more specific connection configuration of the electric storage system. For example, four electric storage modules MOD1 through MOD4 are serially connected. In this case, a total of voltage to be extracted to the positive pole terminal 3 (VB+) and negative pole terminal 4 (VB−) is about 200 V. The module controllers CNT1 through CNT4, and the battery block groups BB1 through BB4 are each included in each electric storage module. Each block group is series connection of 16 battery blocks, for example.

The module controllers CNT1 through CNT4 are connected via the bus, the communication terminal of the module controller CNT4 is connected to the control box ICNT. Information such as voltage and so forth for each module is transmitted from each module controller to the control box ICNT. The control box ICNT further includes a communication terminal 11 so as to externally perform communication.

Example of Module Controllers

Description will be made regarding an example of the configuration of a module controller, with reference to FIG. 5. The module controller CNT is configured to detect the voltages of both edges of n serially connected battery blocks B1 through Bn, and the voltage of each battery block. There is provided a multiplexer 15 which sequentially outputs the voltages of both edges of the battery blocks B1 through Bn, and the voltage of each battery block.

The multiplexer 15 switches a channel, for example, according to a predetermined control signal, and selects one piece of analog voltage data out of n pieces of analog voltage data. The one piece of analog voltage data selected by the multiplexer 15 is supplied to an A/D converter (written as ADC (Analog to Digital Converter) in FIG. 5) 16.

The A/D converter 16 converts the analog voltage data supplied from the multiplexer 15 into digital voltage data. For example, the analog voltage data is converted into 14 through 18-bit digital voltage data. Note that various methods can be employed as the method of the A/D converter 16, such as a successive approximation method, a ☐☐ (digital sigma) method, and so forth.

The digital voltage data from the A/D converter 16 is supplied to the communication unit 17. The communication unit 17 is controlled by the control unit 18, and performs communication with an external device to be connected via communication terminals 19a and 19b. For example, the communication unit 17 performs communication with the module controller of another module via the communication terminal 19a, and performs communication with the control box ICNT via the communication terminal 19b. Further, the module controller CNT receives the control signal from the control box ICNT via the communication terminal 19b. In this way, the communication unit 17 performs two-way communication.

Further, the control unit 18 performs control so as to uniform the voltages of the battery blocks. Such control is referred to as cell balance control. For example, in the event that of the multiple battery blocks B1 through Bn, one battery block has reached use lower limit discharge voltage, there are other battery blocks in which battery capacity still remain. In the case of next charging, the other battery blocks of which the battery capacities will remain will earlier reach charge upper limit voltage, the above battery block will not be charged up to full charge. In order to avoid such unbalance, the battery blocks of which the battery capacities remain are forcibly discharged by turning on the MOSFETs (Metal Oxide Semiconductor Field Effect Transistor). Note that the cell balance control method can be applied to not only the above passive method but also a so-called active method and other various methods. Balance control between modules according to an embodiment of the present disclosure will be described later in detail.

Note that the above module controller CNT monitors the voltage of each battery block, converts detected voltage into a digital signal, and transmits to the control box ICNT. An arrangement may be made wherein the temperature of each battery block is detected in addition to voltage, the temperature is converted into digital data, and transmitted to the control box ICNT.

Figure 5:
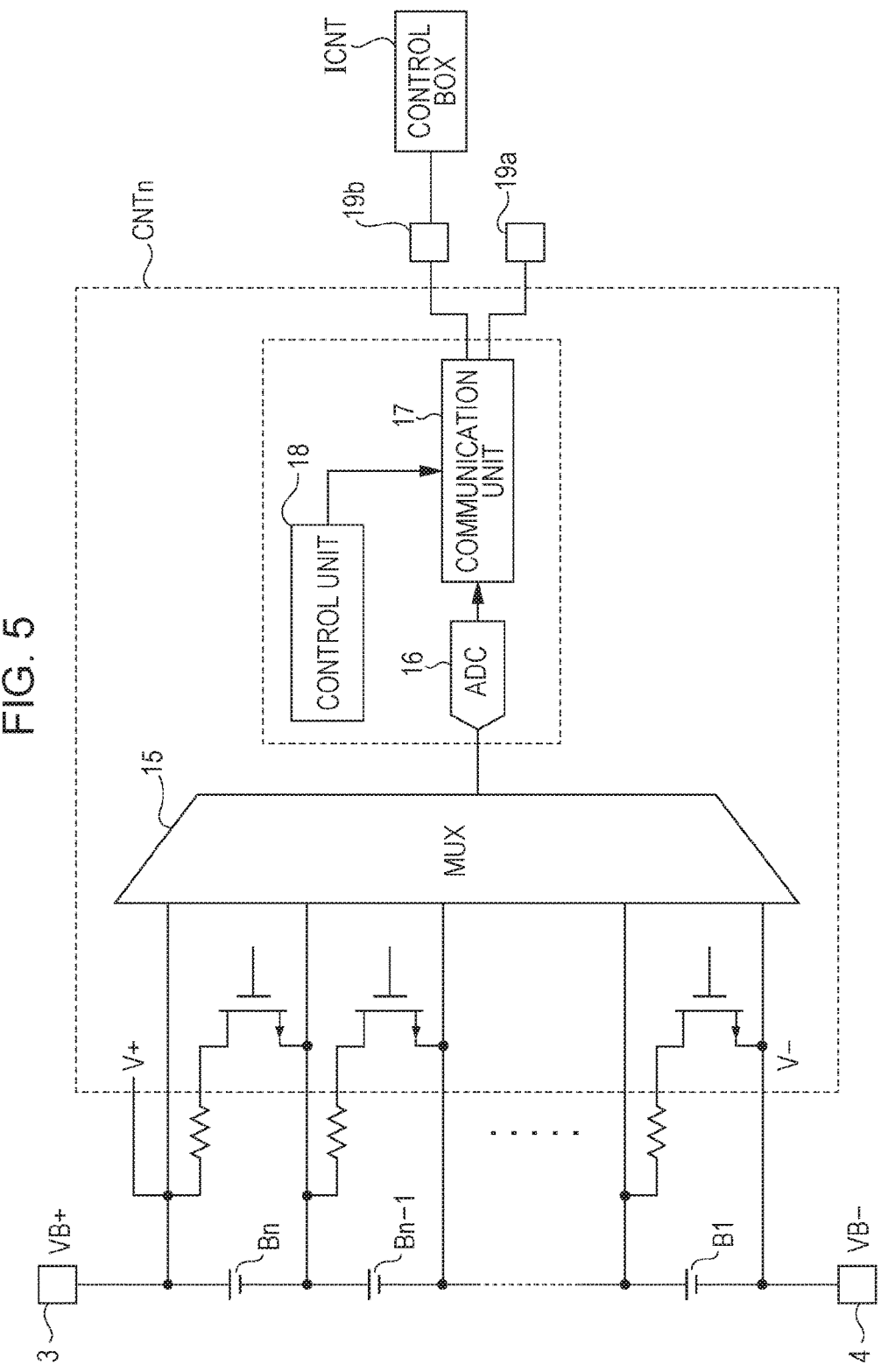
FIG. 5 is a block diagram of an example of a module controller.

The power supply as to the module controllers CNT is, as illustrated in FIG. 5, supplied from the battery blocks B1 through Bn. However, in the event of using the battery blocks B1 through Bn as power sources, the consumption powers of the module controllers CNT are mutually unequal, and accordingly, irregularities of the capacities between the battery blocks B1 through Bn between the modules are caused, and unbalance between the modules occurs. From this point of view, it is desirable that the battery blocks B1 through Bn are not used as the power sources of the module controllers CNT.

With the module controller CNT illustrated in FIG. 5, as illustrated surrounded by a dashed line in the inner side, the A/D converter 16, communication unit 17, and control unit 18 are low-voltage power supply units which can operate at low voltage, e.g., 5-V power supply. With the present disclosure, the power supply as to the low-voltage power supply units is arranged to be supplied from the control box ICNT. In the event of supplying power supply from the battery blocks B1 through Bn, balance between the modules may collapse due to difference in the consumption powers of the module controllers CNT. With the present disclosure, the power supply as to the low-voltage power supply units of the module controllers CNT is supplied from the control box ICNT, and accordingly, such a problem is not caused.

Electric Storage System According to Present Disclosure

Figure 6:
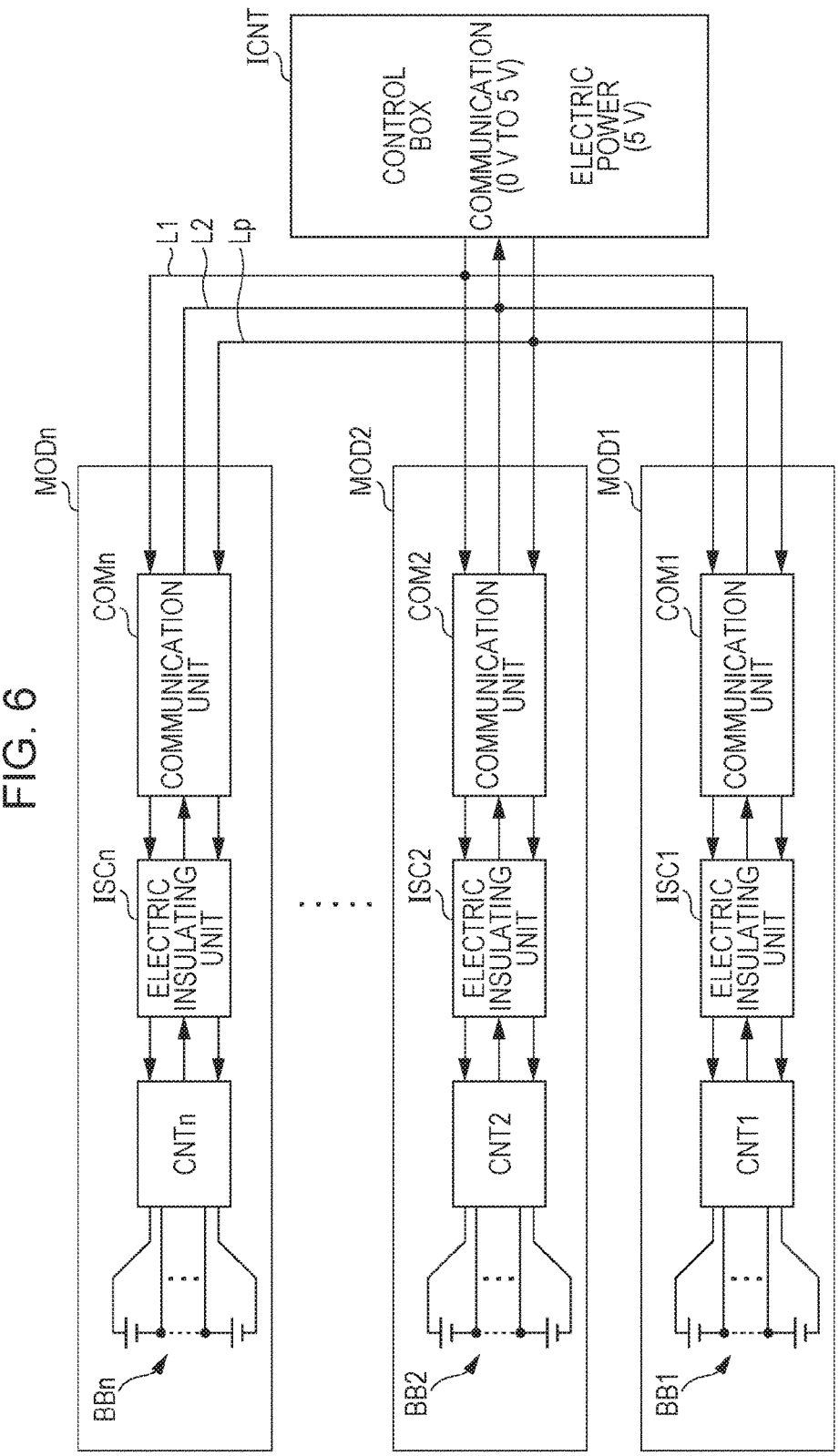
FIG. 6 is a block diagram illustrating the configuration of an electric storage system to which multiple electric storage modules are connected.

A configuration is illustrated in FIG. 6 wherein the present disclosure has been applied to an electric storage system having n electric storage modules MOD1 through MODn. Each electric storage module is configured of communication units COM1 through COMn, insulating units ISC1 through ISCn, module controllers CNT1 through CNTn, and battery block groups BB1 through BBn. The n electric storage modules and the control box ICNT are connected. Communication lines L1 and L2, and a power supply line Lp are used for connection. Two-way communication is performed between the control box ICNT and the electric storage modules MOD1 through MODn through the communication lines L1 and L2. The CAN is used as a communication method, for example. Nowadays, the CAN is used as a vehicle LAN.

The communication units COM1 through COMn of each electric storage module correspond to the communication unit 17 in FIG. 5. Accordingly, the module controllers CNT1 through CNTn in FIG. 6 have the configuration in FIG. 5 from which the communication unit 17 is omitted. However, both of the communication units COM1 through COMn and the communication unit 17 may be provided so as to each have a different function. For example, power supply voltage of +5 V is supplied through the power supply line Lp as the power supply for the low-voltage power supply units of each electric storage module.

The insulating units ISC1 through ISCn have a function for insulating between the communication units COM1 through COMn and the module controllers CNT1 through CNTn. Specifically, the reference potential of the power supply of the communication units COM1 through COMn, and the reference potential of the power supply of the module controllers CNT1 through CNTn are separated and taken as independent circuits. Further, in an insulated state, the insulating units ISC1 through ISCn have a function for supplying power supply voltage to the module controllers CNT1 through CNTn, and a function serving as a transmission medium of two-way communication.

As an example, the power supply voltage as to the control box ICNT and the communication units COM1 through COMn is taken as 0 through +5 V. The power supply voltage as to the module controller CNT1 of the electric storage module MOD1 is taken as 0 through +5 V, the power supply voltage as to the module controller CNT2 of the electric storage module MOD2 is taken as +50 V through +55 V, and the power supply voltage as to the module controller CNTn of the electric storage module MODn is taken as (+50☐n) V through (+50☐n)+5 V.

Insulating Units

As for a two-way communication system to be performed through the insulating units ISC1 through ISCn, there can be employed the standard of the CAN. As for a power transmission system to be performed through the insulating units ISC1 through ISCn, there can be employed an electromagnetic induction system, a magnetic resonance system, a radio wave receiving system, or the like.

With the present disclosure, a noncontact IC card technique is employed. The noncontact IC card technique is a technique wherein the antenna coil of a reader/writer, and the antenna coil of a card are subjected to flux coupling, and communication and power transmission are performed between the reader/writer and the card. As for communication, there is employed a method for subjecting the carrier waves of a frequency of 13.56 kHz to ASK (Amplitude Shift Keying) modulation, and communication is performed at speed of 212 or 424 kbps. The insulating units ISC1 through ISCn have the same specification as with the above noncontact IC card method. Further, the insulating units ISC1 through ISCn are configured so as to perform communication and power transmission between antennas (coils) formed in a different layer of the multi-layer printed-circuit board.

Figure 7:
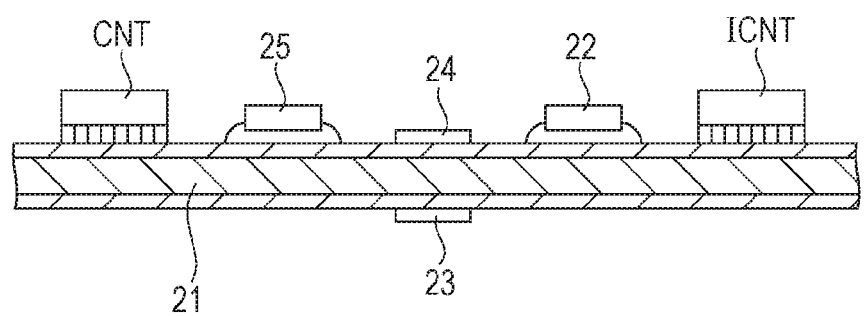
FIG. 7 is an approximate line drawing illustrating a mounted state of components as to a multi-layer wiring board of the electric storage modules.

As illustrated in FIG. 7, an MPU (MicroProcessing Unit) making up the control box ICNT, and an LSI (Large Scale Integrated Circuit) 22 on the reader/writer side of the noncontact IC card method are mounted on a multi-layer printed-circuit board 21. Further, printed-circuit board antennas 23 and 24, an LSI 25 on the card side of the noncontact IC card method, and a module controller CNT are mounted on the multi-layer printed-circuit board 21.

Figure 8:
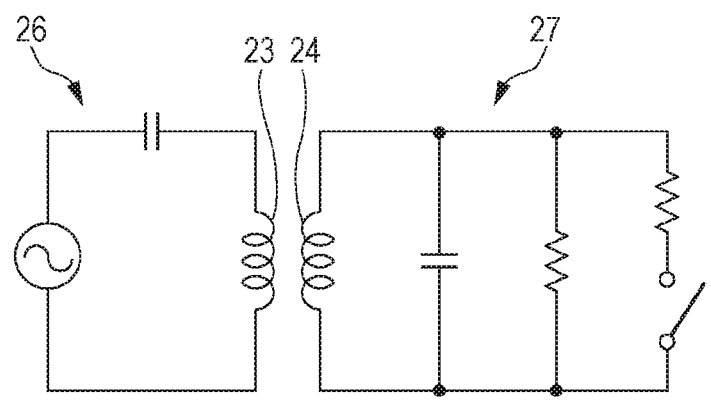
FIG. 8 is a connection diagram illustrating the circuit configuration of an insulating unit.

As schematically illustrated in FIG. 8, with the noncontact IC card method, a transmission signal as to a card unit 27 of which the carrier amplitude is 2 through 13 Vop, and the modulation degree is 10% or so, for example, is formed from the antenna 23 of a reader/writer unit 26. The transmission signal is transmitted from the antenna 23 to the antenna 24 of the card unit 27. The signal received at the antenna 24 is a high-frequency signal of which the carrier amplitude is 2 through 13 Vop, and the modulation degree is 10% or so, for example. The received signal is smoothed, and accordingly, power supply at the card unit 27 is formed. The consumption power at the card unit 27 is sufficiently small.

Figure 9A:
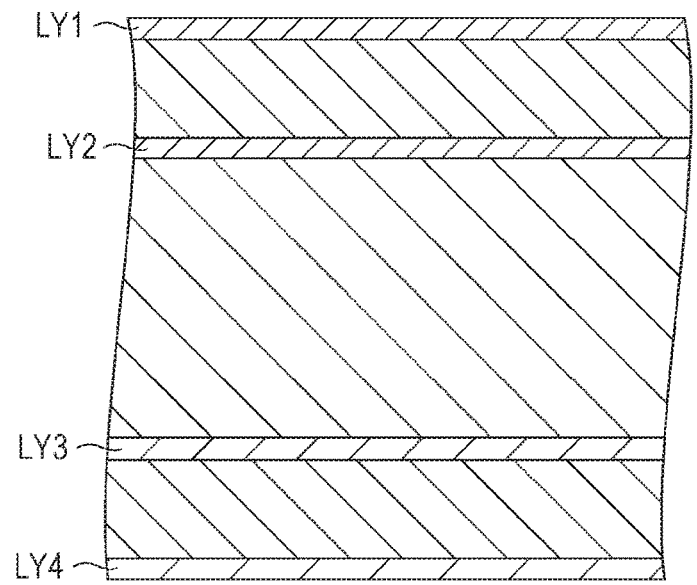
FIGS. 9A and 9B are cross-sectional views for describing a 2-layer wiring board and a 4-layer wiring board.
Figure 9B:
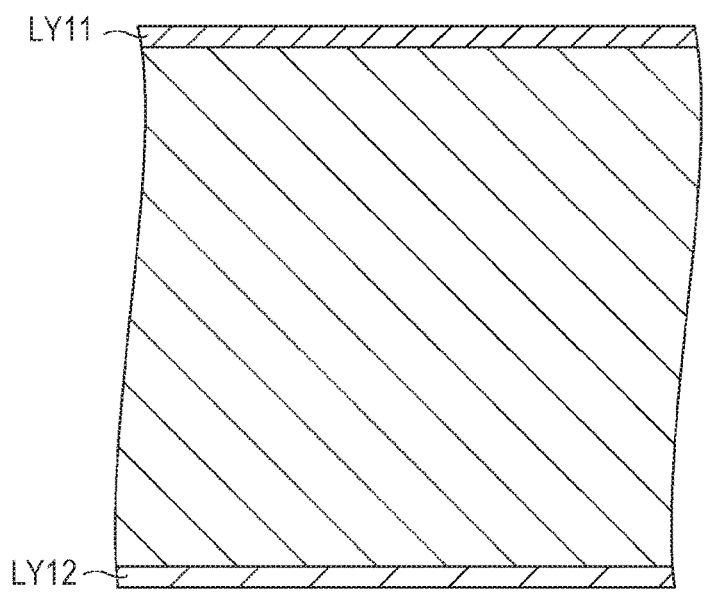

An example of a printed-circuit board antenna will be described. As for the multi-layer printed-circuit board 21 where the antenna is formed as an electroconductive pattern, as illustrated in FIG. 9A, a 4-layer printed-circuit board having four wiring layers LY1 through LY4 is employed. Alternatively, as illustrated in FIG. 9B, a 2-layer printed-circuit board having two wiring layers LY11 and LY12 is employed.

Figure 10A:
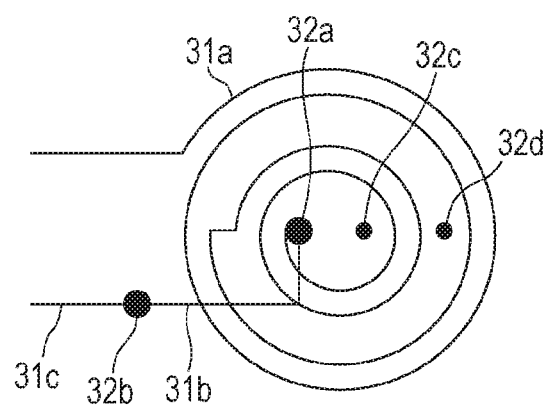
FIGS. 10A and 10B are approximate line drawings for describing a specific example of a printed-circuit board antenna.

As illustrated in FIG. 10A, the antenna 23 on the primary side (reader/writer side) is formed of a spiral pattern 31a, a linear pattern 31b, and a linear patter 31c. The spiral pattern 31a is formed on the fourth wiring layer LY4 of the 4-layer printed-circuit board, and the edge portion of the center portion of the pattern 31a is connected to a land 32a of the third wiring layer LY3 via a land and a through-hole. The linear pattern 31b is formed between the land 32a and a land 32b. The land 32b is connected to the linear pattern 31c via a through-hole and a land of the third wiring layer LY3. The edge portions of the patterns 31a and 31c are connected to an unshown connector.

Figure 10B:
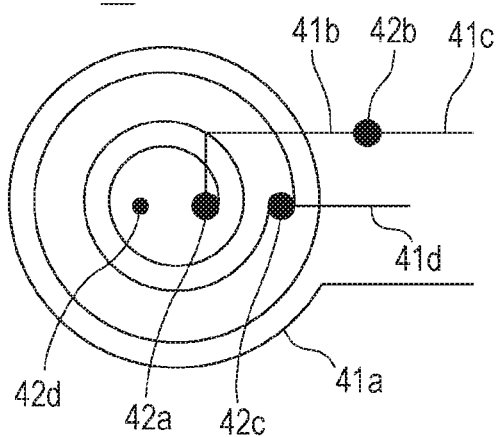

As illustrated in FIG. 10B, the antenna 24 on the secondary side (card side) is formed of a spiral pattern 41a, a linear pattern 41b, a linear pattern 41c, and a linear patter 41d. The spiral pattern 41a of which one edge is connected to the connector (not illustrated) is formed on the first wiring layer LY of the 4-layer printed-circuit board, and is connected to the linear pattern 41b via a land 42a, a through-hole, and a land of the second wiring layer LY2. One edge of the pattern 41b is connected to a land of the first wiring layer LY1 via a land 42b and a through-hole. One edge of the linear pattern 41c is connected to this land of the first wiring layer LY1. The other edge of the linear pattern 41c is connected to the connector (not illustrated). Further, one edge of the linear pattern 41d is connected to a land 42c connected to the spiral pattern 41a. The other edge of the linear pattern 41d is connected to a reference potential point.

In the event that patterns cross, a printed-circuit board antenna is configured of patterns of different wiring layers. A through-hole and a land are used for connecting different wiring layers. As a result thereof, as illustrated in FIG. 10A, unnecessary lands 32c and 32d occur in the fourth wiring layer, and an unnecessary land 42d occurs in the first wiring layer.

Instead of the above patterns being formed on another wiring layer of the printed-circuit board, a jumper lead may be employed. Specifically, instead of the pattern 31b in FIG. 10A, and the patterns 41b and 41d in FIG. 10B, jumper leads are employed. In this case, a 2-layer printed-circuit board can be employed, a through-hole does not have to be formed, and an unnecessary land can be prevented from occurring. Insulation resistance of the printed-circuit board can be improved by not forming a through-hole.

The insulating units according to an embodiment of the present disclosure perform insulation between the primary side antenna and the secondary side antenna using the printed-circuit board. Accordingly, with the insulating units according to an embodiment of the present disclosure, 1000 V or more can be realized as DC insulation voltage. Further, there are advantages wherein two-way communication and power transmission can be performed, whereby the cost can be reduced.

With the present disclosure, voltage balance between the above multiple electric storage modules MOD1 through MODn (hereafter, simply referred to as module balance) is controlled. Specifically, the output voltages of the electric storage modules are uniformed by control of balance between the modules. In general, a great number of battery cells are included in each electric storage module, and accordingly, irregularities between the electric storage modules increases as compared to voltage balance between battery cells within an electric storage module (hereafter, simply referred to as cell balance). Accordingly, it is meaningful to perform module balance control even in the event of performing control of cell balance within an electric storage module.

Figure 11A:
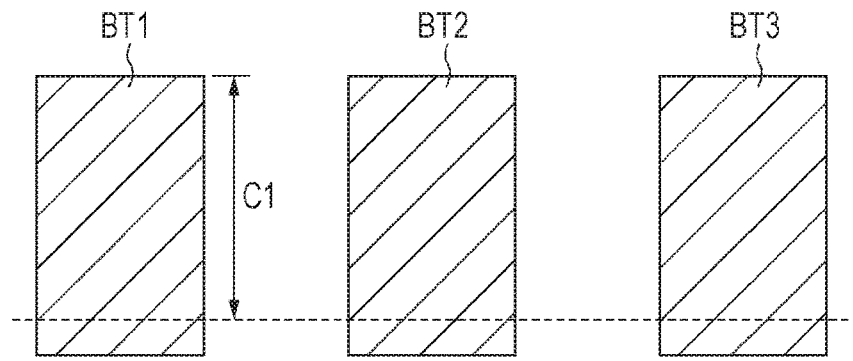
FIGS. 11A through 11C are approximate line drawings for describing importance of bottom balance.
Figure 11B:
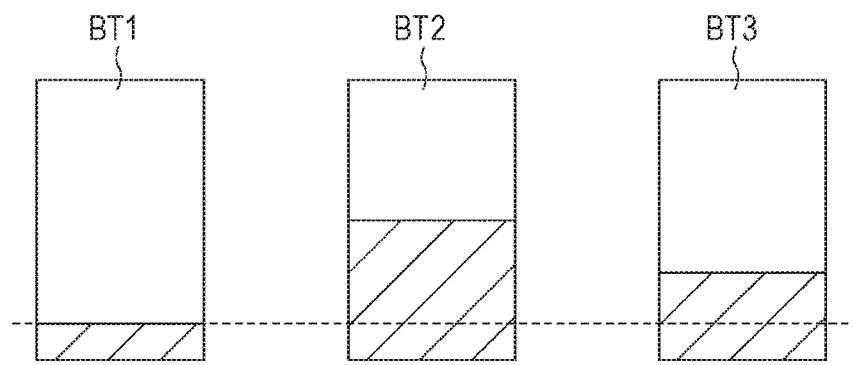
Figure 11C:
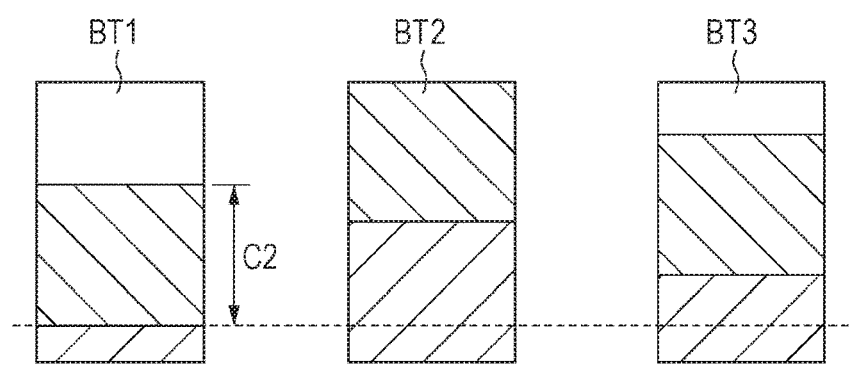

General cell balance control will be described prior to description of the present disclosure. As illustrated in FIGS. 11A through 11C, cell balance between three battery cells BT1, BT2, and BT3 will be studied. First, as illustrated in FIG. 11A, let us say that all of the battery cells have fully been charged. Next, as illustrated in FIG. 11B, let us say that battery cells have been discharged, irregularities have occurred in the discharge amounts thereof, and the voltage of a battery cell BT1 has reached use lower limit voltage indicated with a dashed line. Other battery cells BT2 and BT3 have not still reached the use lower limit voltage due to irregularities between battery cells. For example, difference in self-discharge amounts is a cause of irregularities in discharge amounts between battery cells.

In the event of having started charging in this state, the battery cell BT2 of which the remaining capacity is the largest at the time the voltage of the battery cell BT1 reaching the use lower limit voltage has first reached full capacity. At this point, as illustrated in FIG. 11C, the battery cell BT1 has not been charged up to full charge. Accordingly, in the event that the battery cell BT1 had been charged, discharge amount C1 would be discharged, but the dischargeable amount has been reduced to discharge amount C2.

Figure 12A:
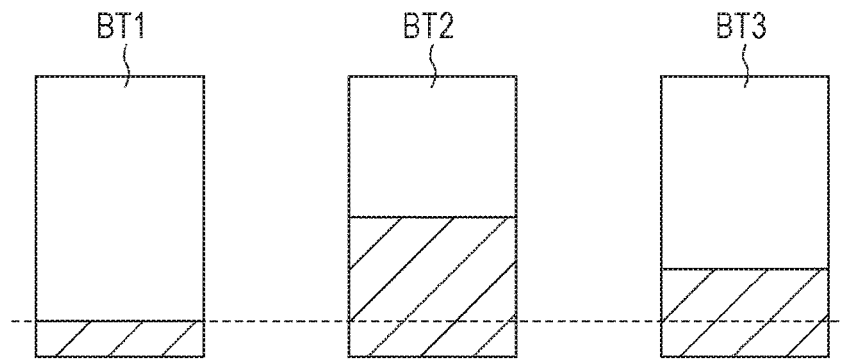
FIGS. 12A through 12C are approximate line drawings for describing an active bottom cell balance operation.
Figure 12B:
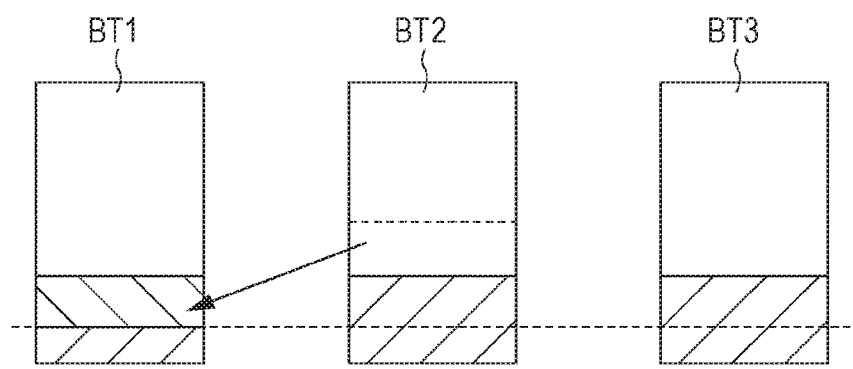
Figure 12C:
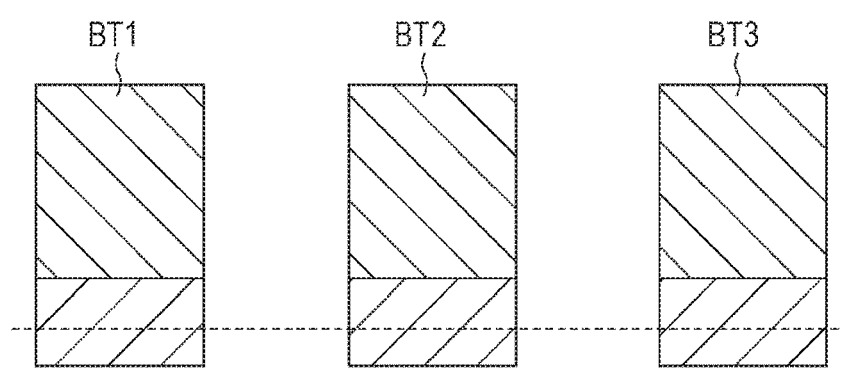

In order to solve this problem, as illustrated in FIGS. 12A and 12B, let us say that at the time of the battery cell BT1 reaching the use lower limit voltage, electric power is moved from the battery cell BT2 of which the capacity has mostly remained (having a highest potential) to another battery cell BT1 of which the capacity is the least (having a lowest potential), and the remaining capacities are generally equal. The battery cells BT1, BT2, and BT3 are charged, whereby the three battery cells can be charged to generally full charge voltage. In reality, multiple times of processing is repeatedly performed.

Such control is referred to as active bottom cell balance control. Decrease in dischargeable amount can be prevented by bottom cell balance control. A method is referred to as passive bottom cell balance control wherein in the state illustrated in FIG. 12A, the battery cells BT2 and BT3 are discharged so as to agree with the potential of the battery cell BT1 having the lowest potential. The active method is preferable since the capacity can effectively be used as compared to the passive method.

Figure 13A:
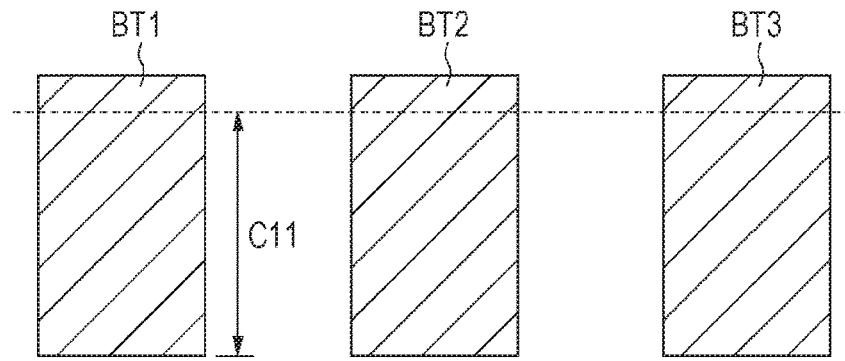
FIGS. 13A through 13C are approximate line drawings for describing importance of top balance.
Figure 13B:
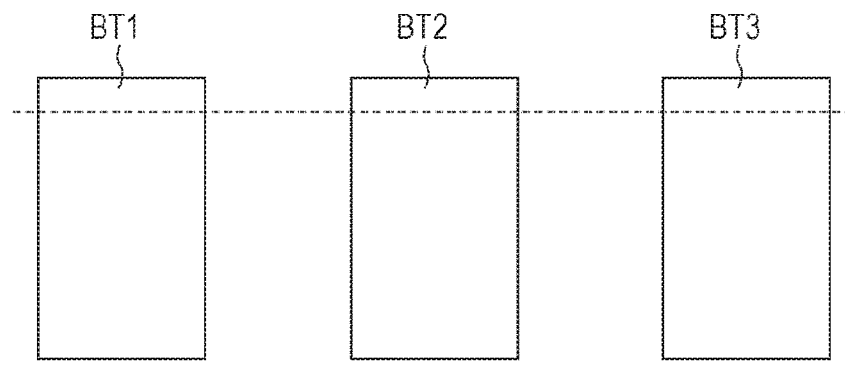

Active top balance control will be described with reference to FIGS. 13A through 14C. First, as illustrated in FIG. 13A, let us say that all of the battery cells have fully been charged. Next, as illustrated in FIG. 13B, let us say that the battery cells have been discharged.

Figure 13C:
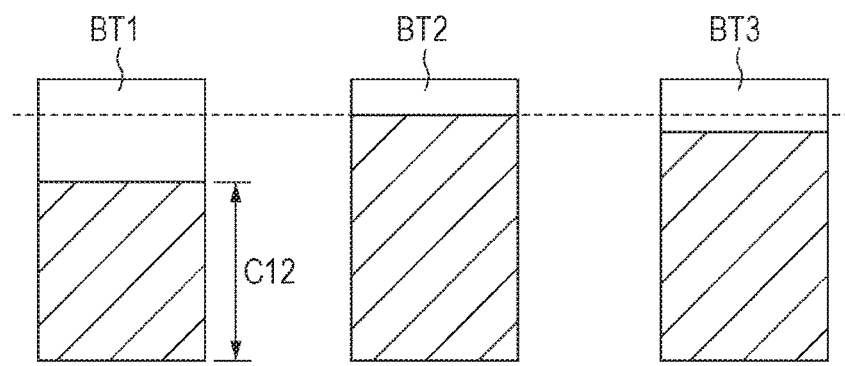

In the event of having started charging, as illustrated in FIG. 13C, the voltage of the battery cell BT2 has first reached the use upper limit voltage. At this point, the voltages of the battery cells BT1 and BT3 have not reached the use upper limit voltage. Accordingly, the charge amount has decreased as illustrated in C12 as compared to the charge amount C11 (FIG. 13A).

In order to solve this problem, as illustrated in FIGS. 14A and 14B, let us say that at the time of the battery cell BT2 reaching the use upper limit voltage, electric power is moved from the battery cell BT2 of which the capacity has mostly remained (having a highest potential) to the battery cell BT1 of which the capacity is the least (having a lowest potential), and the remaining capacities are generally equal. The battery cells BT1, BT2, and BT3 are charged, whereby the three battery cells can be charged to generally full charge voltage. In reality, multiple times of processing is repeatedly performed.

Such control is referred to as active top cell balance control. Decrease in chargeable amount can be prevented by top cell balance control. A method is referred to as passive top cell balance control wherein in the state illustrated in FIG. 14A, the battery cells BT2 and BT3 are discharged so as to agree with the potential of the battery cell BT1 having the lowest potential. The active method is preferable since the capacity can effectively be used as compared to the passive method.

Existing Cell Balance Control Circuit

Description will be made regarding an example of an existing active bottom cell balance circuit which uses a flyback transformer, with reference to FIGS. 15A, 15B, and FIG. 16. The positive pole and negative pole of each battery cell are connected to both edges of the primary side coils W1 through W6. The positive pole and negative pole of the series connection of six battery cells BT1 through BT6 are connected to both edges of the secondary side coil W0. Further, a common magnetic core M is provided. Further, the secondary side coil W0 is serially connected to the secondary side switch S0, and the primary side coils W1 through W6 are serially connected to the primary side switches S1 through S6, respectively. The switches S0 through S6 are configured of a MOS (Metal Oxide Semiconductor) FET, for example.

Figure 15B:
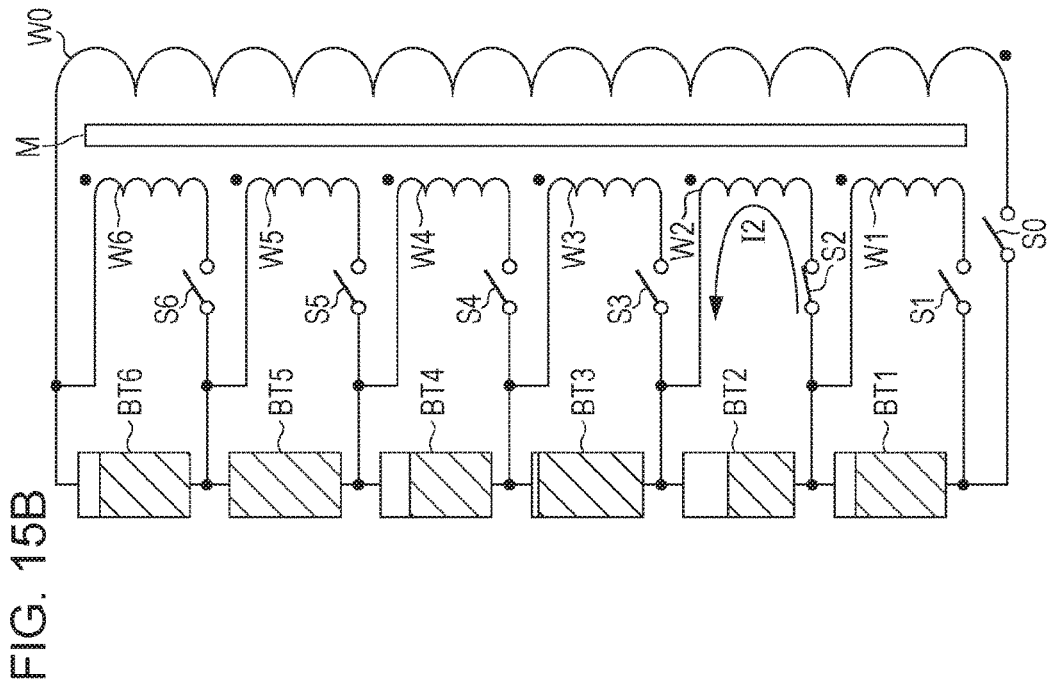
FIGS. 15A and 15B are connection diagrams of an active bottom cell balance circuit according to the related art.
Figure 15A:
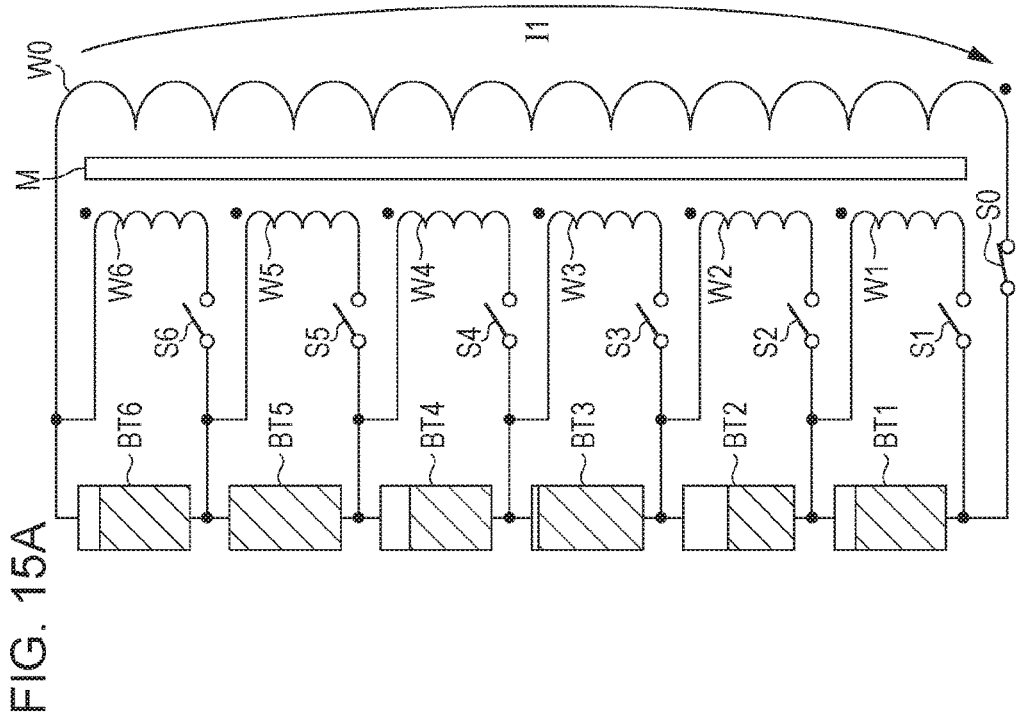

FIG. 16 is a timing chart of the operation of the active bottom cell balance circuit illustrated in FIGS. 15A and 15B. As an example, the voltages of the battery cells BT1 through BT6 have been detected by an unshown monitor unit, and the voltage of the battery cell BT2 has been detected to be the lowest. In this case, electric power is moved from another battery cell to the battery cell BT2. First, as illustrated in FIG. 15A and A in FIG. 16, the switch S0 is turned on, and current I1 flows into the coil W0 as illustrated in C in FIG. 16, and the magnetic core M is magnetized.

Next, as illustrated in FIG. 15B and B in FIG. 16, the primary side switch S2 serially connected to the coil W2 is turned on, and also as illustrated in A in FIG. 16, the secondary side switch S0 is turned off. The magnetic energy of the magnetic core M is emitted, and the current I2 flows into the primary side coil W2 as illustrated in D in FIG. 16. This current I2 flows into the battery cell BT2, and the battery cell BT2 is charged.

Thereafter, the primary side switch S2 is turned off as illustrated B in FIG. 16. Further, pause time for a predetermined period of time continues thereafter. The on period of the primary side switch S0, the on period of the primary side switch S2, and the pause period described above are taken as a cycle period, and the operation is repeated.

Description will be made regarding an example of an existing active top cell balance circuit, with reference to FIGS. 17A, 17B, and 18. The positive pole and negative pole of each battery cell are connected to both edges of the primary side coils W1 through W6. The positive pole and negative pole of the series connection of six battery cells BT1 through BT6 are connected to both edges of the secondary side coil W0. Further, a common magnetic core M is provided. Further, the primary side coils W1 through W6 are serially connected to the primary side switches S1 through S6, respectively. The secondary side coil W0 is serially connected to the secondary side coil W0, and switches S0 through S6 are configured of a MOSFET, for example.

Figure 17A:
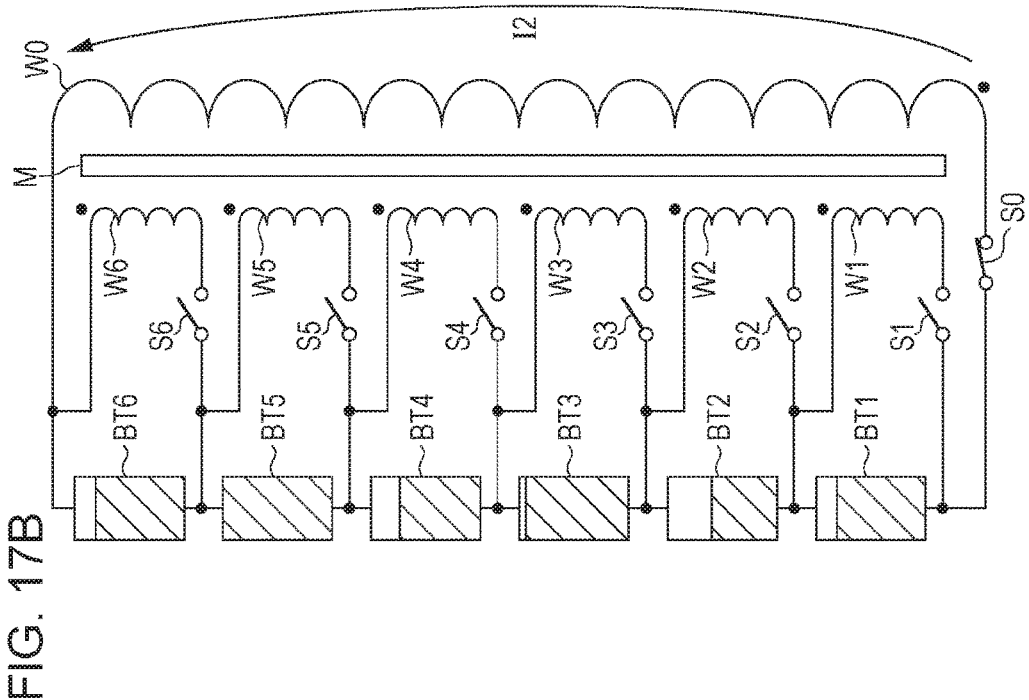
FIGS. 17A and 17B are connection diagrams of an active top cell balance circuit according to the related art.
Figure 17B:
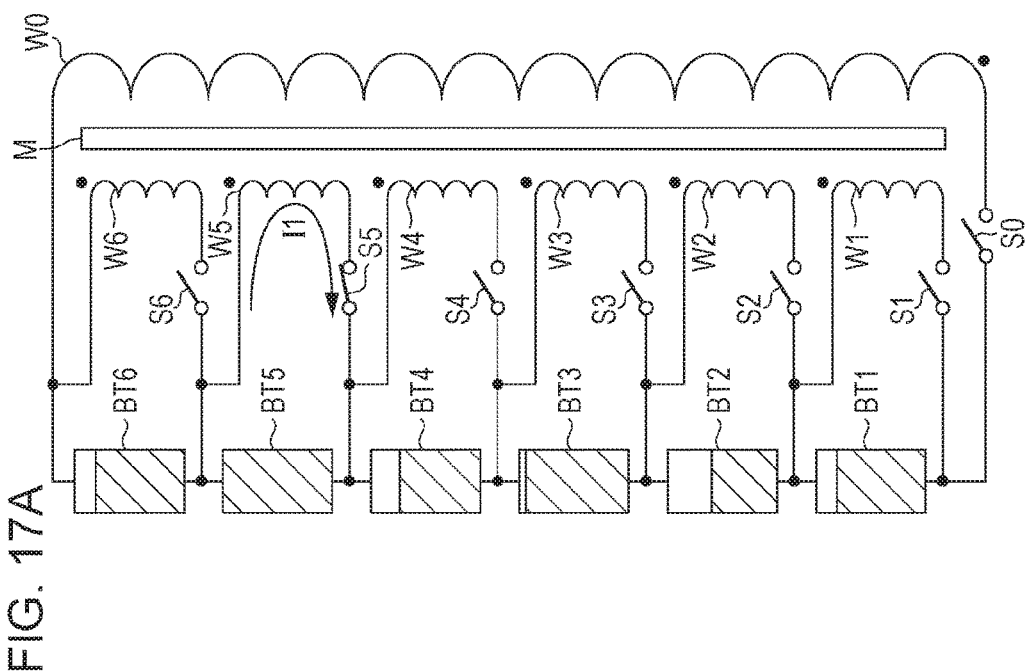

FIG. 18 is a timing chart of the operation of the active top cell balance circuit illustrated in FIGS. 17A and 17B. As an example, the voltages of the battery cells BT1 through BT6 have been detected by an unshown monitor unit, and the voltage of the battery cell BT5 has been detected to be the highest. In this case, electric power is moved from the battery cell BT5 to another battery cell. First, as illustrated in FIG. 17A and B in FIG. 18, the switch S5 is turned on, and current I1 flows into the coil W5 as illustrated in FIG. 18D, and the magnetic core M is magnetized.

Next, as illustrated in FIG. 17B and A in FIG. 18, the secondary side switch S0 is turned on, and also as illustrated in B in FIG. 18, the primary side switch S5 is turned off. The current I2 flows into the secondary side coil W0 by the electromagnetic energy of the magnetic core M as illustrated in C in FIG. 18. This current I2 flows into the series connection of the battery cells BT1 through BT6, and electric power is distributed to the batteries.

Thereafter, the secondary side switch S0 is turned off as illustrated in A in FIG. 18. Further, pause time for a predetermined period of time continues thereafter. The on period of the primary side switch S5, the on period of the secondary side switch S0, and the pause period described above are taken as a cycle period, and the operation is repeated.

Inter-module Balance Circuit

The above existing balance circuit relates to battery cells, and in the event of having applied this circuit to balance between modules described with reference to FIGS. 1 through 6, a problem occurs. Note that balance between modules is balance of voltage of a battery unit made up of multiple battery cells or multiple battery blocks within each electric storage module. In general, unbalance between modules has a greater value as compared to unbalance within a module. As a result of performing balance control for each electric storage module, unbalance between modules can also be eliminated, but time used for the processing is lengthened. However, balance control between modules, and the above existing cell balance control may be used together. In this case, as an example, balance control between modules is previously performed, and thereafter, balance control within a module is performed.

Figure 19:
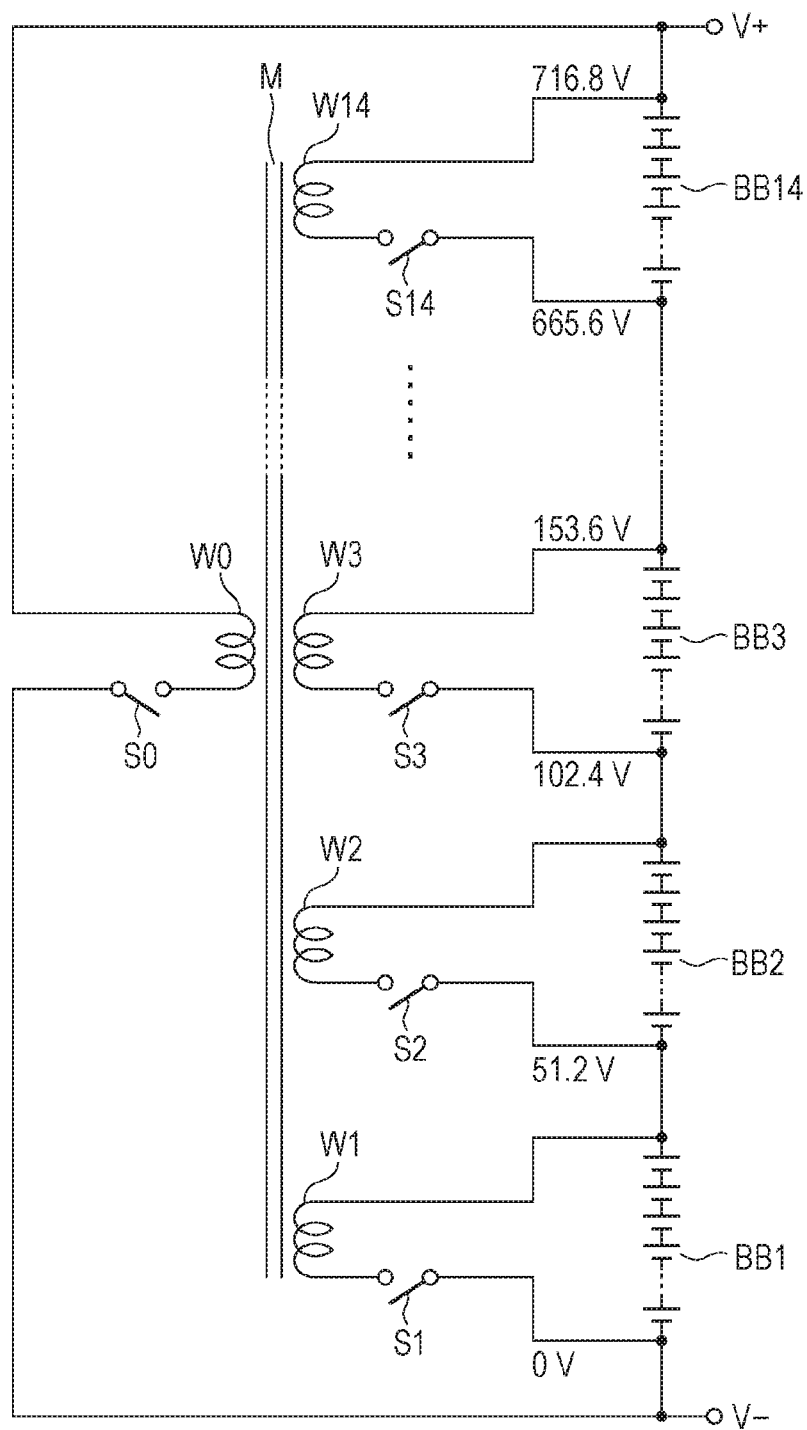
FIG. 19 is a connection diagram of an example of an inter-module balance circuit according to the related art.

A configuration is illustrated in FIG. 19 wherein the existing cell balance circuit has been applied to an active inter-module balance circuit without change. For example, balance control between 14 modules is performed. Battery block groups BB1 through BB14 are serially connected. Each battery block group has a configuration wherein eight battery cells are connected in parallel, and 16 parallel connections (battery blocks) of eight battery cells are serially connected (what is called (8P16S)). For example, one battery block group generates voltage of (3.2 V☐16=51.2 V). Accordingly, with 14 battery block groups BB1 through BB14, series connection thereof generates voltage of (51.2 V☐14=716.8 V).

The positive pole side and negative pole side of the series connection of the 14 battery block groups, and both edges of the secondary side coil W0 are connected. Further, a common magnetic core M is provided. Further, the secondary side coil W0 is serially connected to the secondary side switch S0, and the primary side coils W1 through W14 are serially connected to the primary side switches S1 through S14, respectively. The switches S0 through S14 are configured of a MOSFET, for example.

As for an active bottom cell balance operation in the configuration in FIG. 19, the switch S0 is turned on to magnetize the magnetic core M using current flowing into the secondary side coil W0, next, the primary side switch of an electric storage module having the lowest voltage is turned on to charge the battery block group of this electric storage module using electromagnetic energy sent to the primary side coil. As an example, in the event that the voltage of the battery block group BB2 is 32.0 V, and the voltages of other battery block groups are 32.6 V, the secondary side switch S0 is turned on for a predetermined period of time, following which the switch S0 is turned off, and also, the primary side switch S2 of the battery block group BB2 is turned on. The battery block group BB2 is charged by current flowing into the primary side coil W2.

As for an active top cell balance operation in the configuration in FIG. 19, a switch connected to the primary side coil of a battery block group having the highest voltage is turned on, next, this is turned off, and also, the switch S0 is turned on to send current to the secondary side coil W0 and to charge the battery block groups BB1 through BB14. As an example, in the event that the voltage of the battery block group BB2 is 56.5 V, and the voltages of other battery block groups are 55.9 V, the primary side switch S2 is turned on for a predetermined period of time, following which the switch S2 is turned off, and also, the secondary side switch S0 is turned on. The battery block groups BB1 through BB14 are charged by current flowing into the secondary side coil W0.

With the configuration in FIG. 19, the magnetic core M of the transformer is shared, and accordingly, it is difficult to configure multiple, e.g., 14 electric storage modules by being housed in a separate case. In this case, a transformer portion made up of the magnetic core, coils, and switches is housed in a case different from the 14 electric storage modules to configure a transformer apparatus, and the 14 electric storage modules are connected in a star shape with this transformer apparatus as the center. Such a star-shaped configuration includes a problem that increase in the number of electric storage modules causes star-shaped wirings to be complicated.

Problems with Inter-Module Balance Circuit According to Related Art

With the configuration in FIG. 19, voltage of 716.8 V is applied to the series circuit of the secondary side coil W0 and switch S0 by the 14 serially connected battery block groups. Suitable voltage withstanding in the case of actual use is taken as around three times of applied voltage, and accordingly, the voltage withstanding of a semiconductor switching device such as an FET making up the switch S0, or the like is equal to or greater than 2000 V. It is difficult to realize the configuration in FIG. 19 demanding such a voltage withstanding semiconductor switching device.

Figure 20:
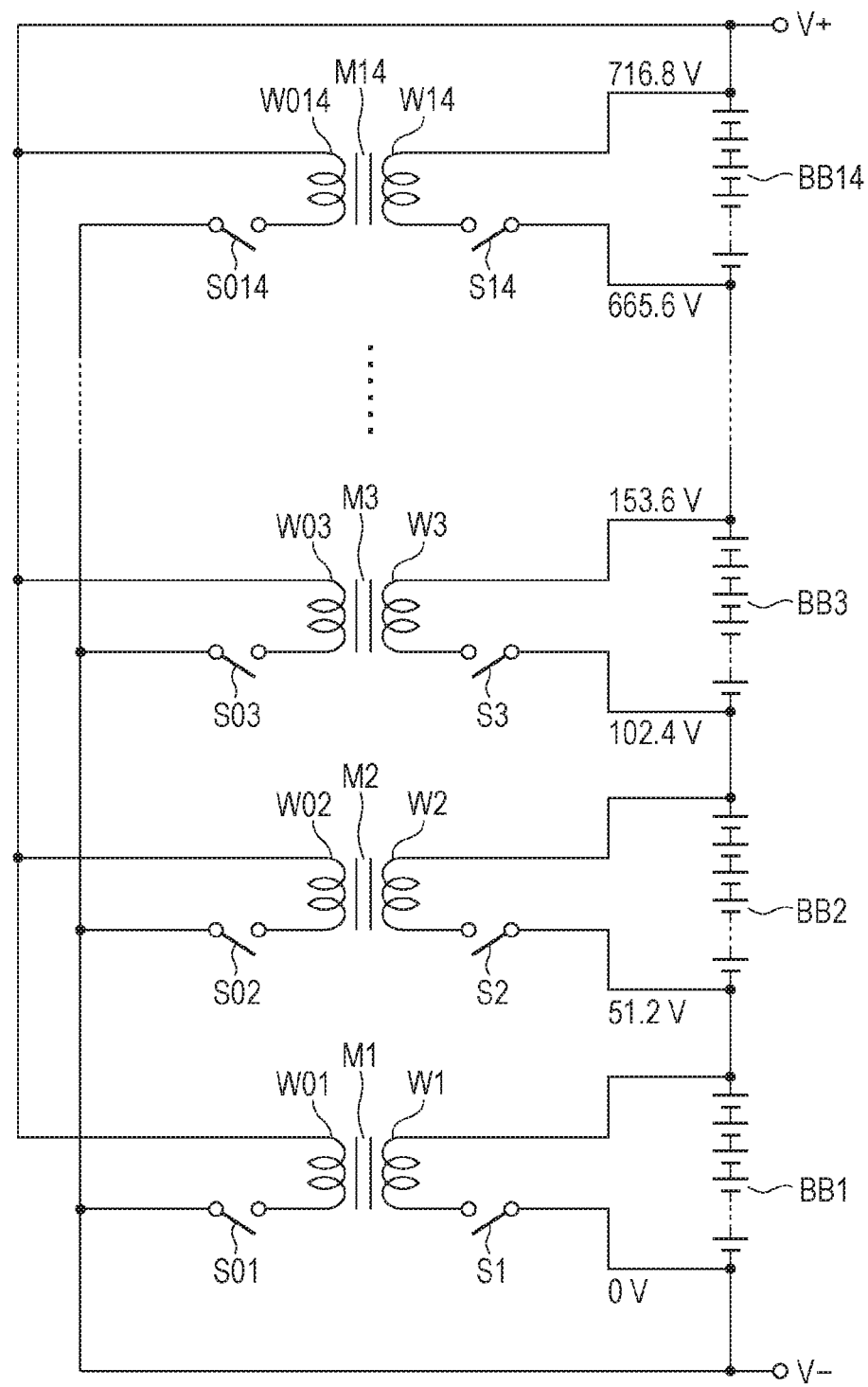
FIG. 20 is a connection diagram of an example of an inter-module balance circuit.

As illustrated in FIG. 20, the magnetic core M is divided into 14 magnetic cores M1 through M14, and the secondary side coil W0 is divided into 14 secondary side coils W01 through W014. Thus, 14 electric storage modules can be divided and housed in a case. With the configuration in FIG. 20, voltage of 716.8 V is applied to each of the primary switch S01 through S014. However, with the configuration in FIG. 20, flyback transformers are separately configured, the primary and secondary switches thereof are connected to the coils respectively, whereby an independent switching operation can be controlled. Accordingly, as described later, control can be performed wherein electric power is extracted from multiple battery block groups in parallel, or electric power is supplied to the multiple battery block groups in parallel. Moreover, the length of the on period of a switching operation is controlled, whereby electric power amount can be controlled.

Inter-module Balance Circuit According to Present Disclosure

Figure 21:
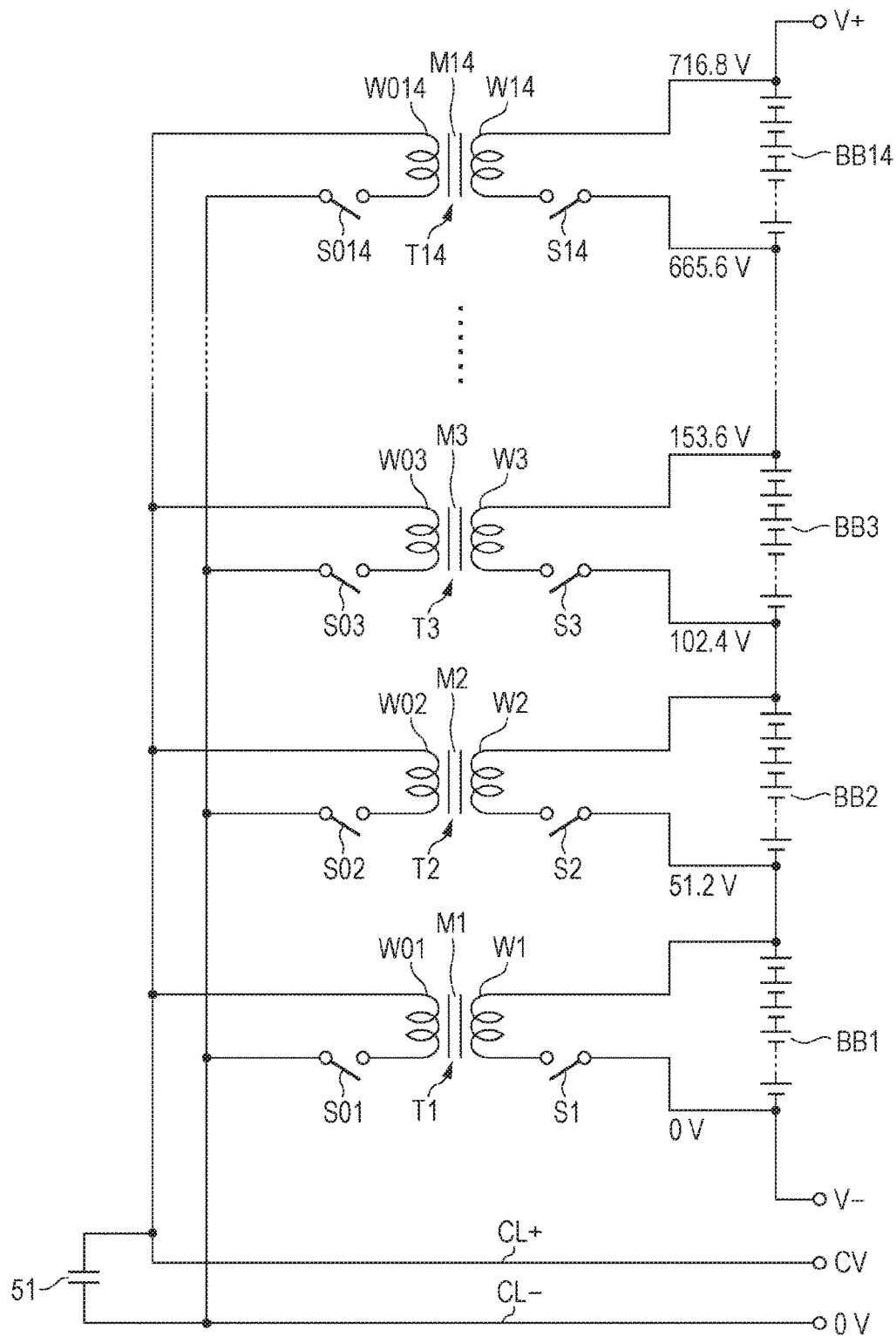
FIG. 21 is a connection diagram of a first example of an inter-module balance circuit according to an embodiment of the present disclosure.

As illustrated in FIG. 21, with the present disclosure, a flyback transformer T1 is configured of a primary side coil W1, a secondary side coil W01, and a magnetic core M1. The primary side coil W1 and a switch S1 are serially connected, and the secondary side coil W01 and a switch S01 are serially connected. Similarly, flyback transformers T2 through T14 are configured of the primary side coils W2 through W14, secondary side coils W02 through W014, and magnetic cores M2 through M14. The primary side coils W2 through W14, and the switches S2 through S14 are serially connected. The secondary side coils W02 through W014 and the switches S02 through S014 are serially connected.

The series circuit of the primary side coil W1 and switch S1 of the flyback transformer T1 is connected to the positive side and negative side of a battery block group BB1 of an electric storage module. The series circuit of each of the other primary side coils W2 through W14 and switches S2 through S14 are serially connected to the positive side and negative side of the battery block groups BB2 through BB14 of an electric storage module.

An electric storage element 51 is provided, and common power supply voltage CV is generated by the electric storage element 51. The common power supply voltage CV is taken as voltage lower than the total voltage 716.8 V of the series connection of the battery block groups. Preferably, the common power supply voltage CV is set to generally one third of voltage of the voltage withstanding of a secondary side switch or less. For example, the common power supply voltage CV is set to a value generally equal to the unit voltage (51.2 V) of battery block groups. The potential of the common power supply voltage CV is controlled so as to become desired voltage without depletion nor overflowing by controlling total discharge current and total charge current.

The electric storage element 51 is a battery, capacitor, or the like. One common power supply line CL+ is taken as the common power supply voltage CV, and the other common power supply line CL− is taken as 0 V. The other common power supply line CL− is taken as a separate power source which is not connected to the power source (V−) of the series connection of the battery block groups of multiple electric storage modules. However, the common power supply line CL− may be connected to the power source V−. One edges of the divided primary side coils W01 through W014 are each connected to the common power supply line CL+, and the other edges of the divided secondary side coils W01 through W014 are each connected to the common power supply CL− through the switches S01 through S014.

Figure 22:
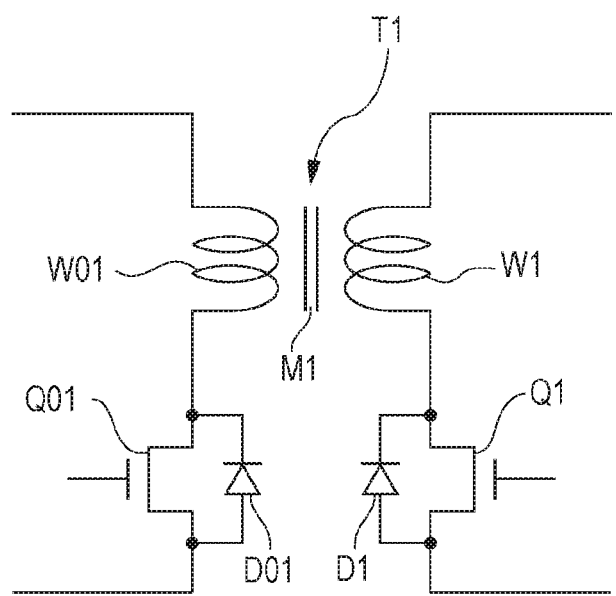
FIG. 22 is a connection diagram illustrating a specific example of a switch.

The switches S0 through S14 and switches S01 through S014 are configured of a MOSFET, for example. For example, as illustrated in FIG. 22, the switch S01 of the flyback transformer T1 is configured of a MOSFET Q01, and a diode D01 connected between the drain and source thereof, and the switch S1 is configured of the MOSFET Q01, and a diode D1 connected between the drain and source thereof. On/off of a switch is controlled by a control signal from the control unit of the control box ICNT. The control box ICNT receives information as a voltage monitoring result from the module controller CNT of each electric storage module to generate a control signal (pulse signal). Note that a semiconductor switching device other than MOSFETs may be employed, such as an IGBT (Insulated Gate Bipolar Transistor) or the like. Note that, with regard to current that flows from the source to the drain direction, the current automatically flows into the switch (configured of a MOSFET and a diode connected between the drain and source thereof) through the diode without a control signal (switch is automatically turned on).

The common power supply voltage CV is applied to the series circuits of the secondary side coils W01 through W014 and switches S01 through S014. For example, the common power supply voltage VC is set to the same voltage (51.2 V) as the voltage applied to the primary side coils and switches, the voltage withstanding of the secondary side switches S01 through S014 can be set to 154 V or so. Such voltage withstanding is not so high for a semiconductor switch making up the secondary switches S01 through S014, whereby an inter-module balance circuit can readily be configured.

With regard to each of the flyback transformers T1 through T14, a winding ratio between the primary side coils and the secondary side coils is not restricted to 1, but the phases are inverted between the primary side and the secondary side. Further, the flyback transformers T1 through T14 can transmit electric power two-way. Accordingly, the notations of the primary side and secondary side are for convenience, and either of electric power transmission from the primary side to the secondary side, and electric power transmission from the secondary side to the primary side can be performed.

In the event of taking the flyback transformer T1 as an example, upon the switch S1 being turned on from a state in which the switches S1 and S01 are off, current flows into the coil W1, and the magnetic core M1 is magnetized. Current that increases over time flows into the coil W1 during a period for the switch S1 being on. Next, upon the switch S1 being turned off, and the switch S01 being turned on, current flows into the coil W01 via the switch S01 since the magnetic core has been magnetized. This current decreases over time. The operations of the other flyback transformers are the same. The flyback transformers have a function as a coupling inductor.

With an active bottom cell balance operation in the configuration in FIG. 21, electric power is moved from a battery block group having the highest voltage to the electric storage element 51 by controlling a primary side switch. Further, electric power is moved to the battery block group of an electric storage module having the lowest voltage by controlling a secondary side switch. In this way, the inter-module balance circuit according to an embodiment of the present disclosure moves electric power via two stages of two-way flyback transformers.

As an example, description will be made regarding an operation in the case that the voltage of the battery block group BB3 is the highest voltage 32.6 V, and the voltage of the battery block group BB2 is the lowest voltage 32.6 V. First, the switch S3 is turned on, and current flows into the primary side coil W3 of the flyback transformer T3 with the battery block group BB3 as a power source. Next, the switch S3 is turned off, and the switch S03 is turned on. According to electromagnetic energy, current flows into the secondary side coil W03, and the electric storage element 51 is charged.

Next, the switch S03 is turned off, and also, the switch S02 is turned on, and according to the electric storage element 51, current flows into the secondary side coil W02 of the flyback transformer T2. Next, the switch S02 is turned off, and also, the switch S2 is turned on, and the battery block group BB2 is charged by current flowing into the primary side coil W2. In this way, the active bottom cell balance operation is performed.

With an active top cell balance operation in the configuration in FIG. 21, electric power is moved from a battery block group having the highest voltage to the electric storage element 51 by controlling a primary side switch. Further, electric power is moved to the battery block group of an electric storage module having the lowest voltage by controlling a secondary side switch. In this way, the inter-module balance circuit according to an embodiment of the present disclosure moves electric power via two stages of two-way flyback transformers.

As an example, description will be made regarding an operation in the case that the voltage of the battery block group BB3 is the highest voltage 56.5 V, and the voltage of the battery block group BB2 is the lowest voltage 55.9 V. First, the switch S3 of the flyback transformer T3 is turned on, and current flows into the primary side coil W3 with the battery block group BB3 as a power source. Next, the switch S3 is turned off, and the switch S03 is turned on. According to electromagnetic energy, current flows into the secondary side coil W03, and the electric storage element 51 is charged.

Next, the switch S03 is turned off, and also, the switch S02 of the flyback transformer T2 is turned on, and according to the electric storage element 51, current flows into the secondary side coil W02. Next, the switch S02 is turned off, and also, the switch S2 is turned on, and the battery block group BB2 is charged by current flowing into the primary side coil W2. In this way, the active top cell balance operation is performed.

Figure 23:
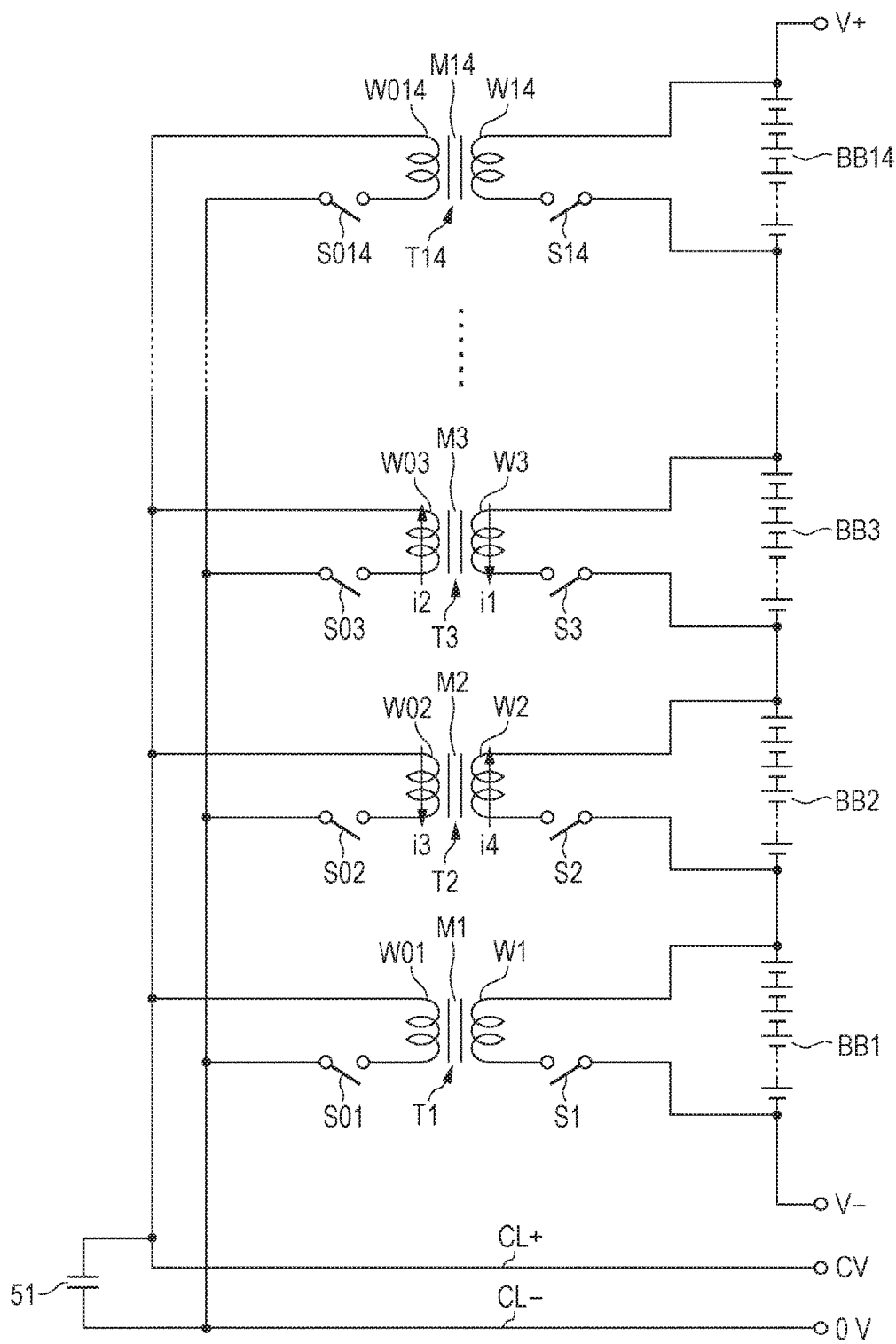
FIG. 23 is a connection diagram for operation description of the first example of the inter-module balance circuit according to an embodiment of the present disclosure.

The active top cell balance operation will be described in more detail, with reference to FIG. 23 and FIG. 24. As illustrated in FIG. 23, current that flows into the coil W3 of the flyback transformer T3 is denoted as i1, and current that flows into the coil W03 is denoted as i2. The currents i1 and i2 have an opposite phase. Current that flows into the coil W02 of the flyback transformer T2 is denoted as i3, and current that flows into the coil W2 is denoted as i4. The currents i3 and i4 have an opposite phase. Further, let us say that the electric storage element 51 has sufficiently been charged at the time of start of the operation.

Figure 24:
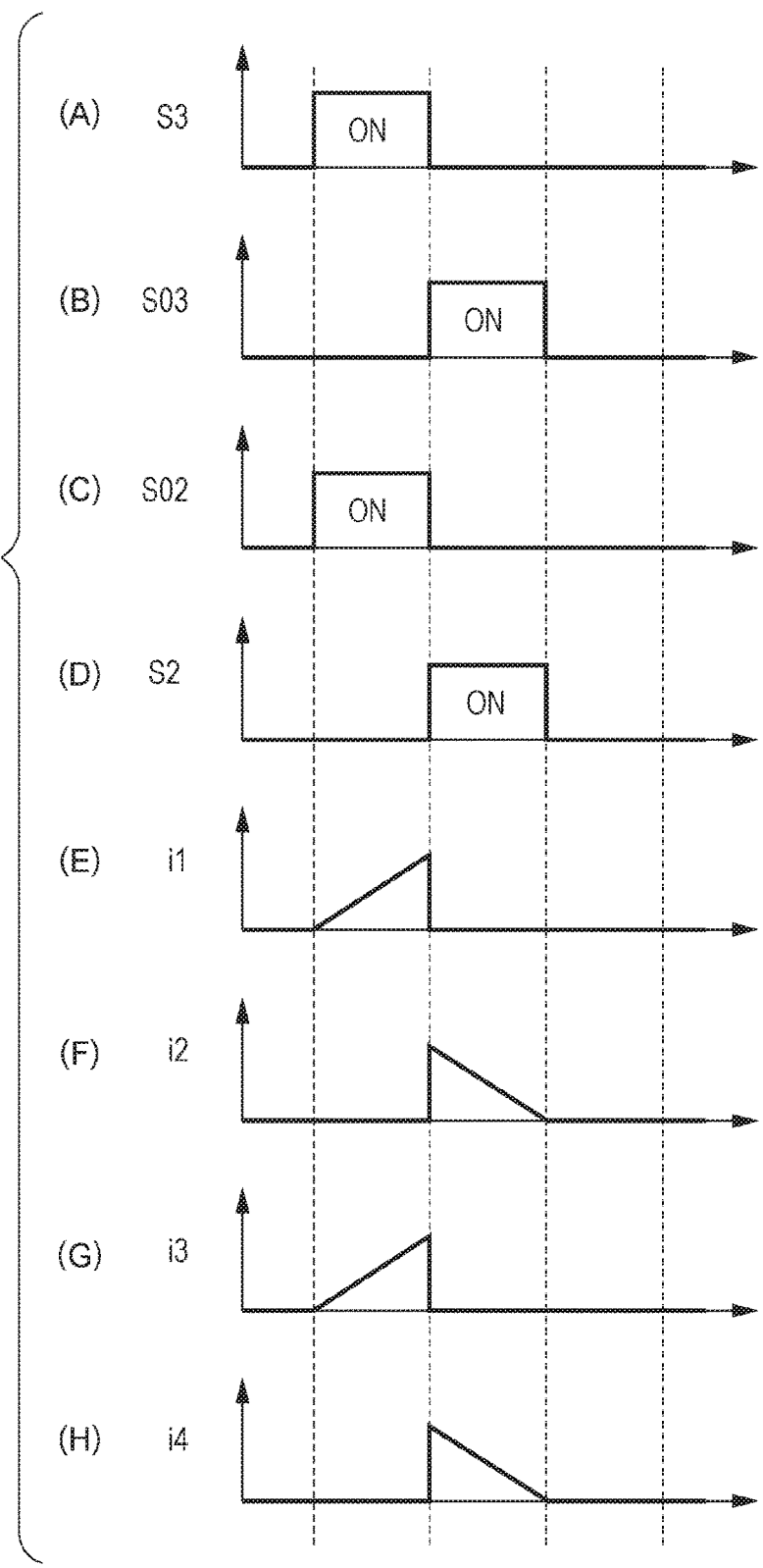
FIG. 24 is a timing chart for operation description of the first example of the inter-module balance circuit according to an embodiment of the present disclosure.

As illustrated in the timing chart in FIG. 24, electric power transmission to be performed through the flyback transformer T3, and electric power transmission to be performed through the flyback transformer T2 are performed in parallel. First, as illustrated in A and C in FIG. 24, the switches S3 and S02 are turned on for the same period. According to on of the switch S3, the current i1 that gradually increases flows into the coil W3 as illustrated in E in FIG. 24. According to on of the switch S02, the current i3 that gradually increases flows into the coil W02 as illustrated in G in FIG. 24. The current i3 flows into the electric storage element 51 in the discharging direction.

Next, the switching devices S3 and S02 are turned off, and as illustrated in B and D in FIG. 24, the switches S03 and S2 are turned on for the same period. According to on of the switch S03, the current i2 that gradually decreases flows into the coil W03 as illustrated in F in FIG. 24. The current i2 flows into the electric storage element 51 in the charging direction. According to charging as to the electric storage element 51 by the current i2, electric power is moved to the electric storage element 51 from the battery block group BB3.

According to on of the switch S2, the current i4 that gradually decreases flows into the coil W2 as illustrated in H in FIG. 24. The current i4 flows in a direction for charging the battery block group BB2. According to charging by the current i4, the electric power of the electric storage element 51 is moved to the battery block group BB2. Note that actual electric power transmission is performed so that the electric power is gradually moved not by one-time switching operation but by multiple times of switching operations. Further, a pulse signal as to a switch is subjected to pulse width modulation to control the on period of the switch, whereby the movement amount of electric power can be set to desired move amount. Also, in FIG. 24, the switches S3 and S02 are described in a synchronous manner, but in reality, the common power supply voltage CV does not have to have a synchronous relation if a certain degree of width is permitted.

Modification of Inter-Module Balance Circuit According to Present Disclosure

With the above inter-module balance circuit according to an embodiment of the present disclosure, electric power extracted via one flyback transformer has been moved through one flyback transformer. However, electric power may be extracted through multiple flyback transformers. For example, electric power may be extracted from two of an electric storage module having the maximum voltage, and an electric storage module having the second maximum voltage. Further, the extracted electric power may be moved via multiple flyback transformers. For example, electric power may be supplied to two of an electric storage module having the minimum voltage, and an electric storage module having the second minimum voltage. For example, with the above configuration in FIG. 21, electric power is extracted with small current through the flyback transformer T14, and simultaneously, electric power is extracted with large current through the flyback transformer T3. Further, simultaneously with extraction of electric power, electric power can be supplied with middle current through each of the flyback transformers T1 and T2.

Figure 25:
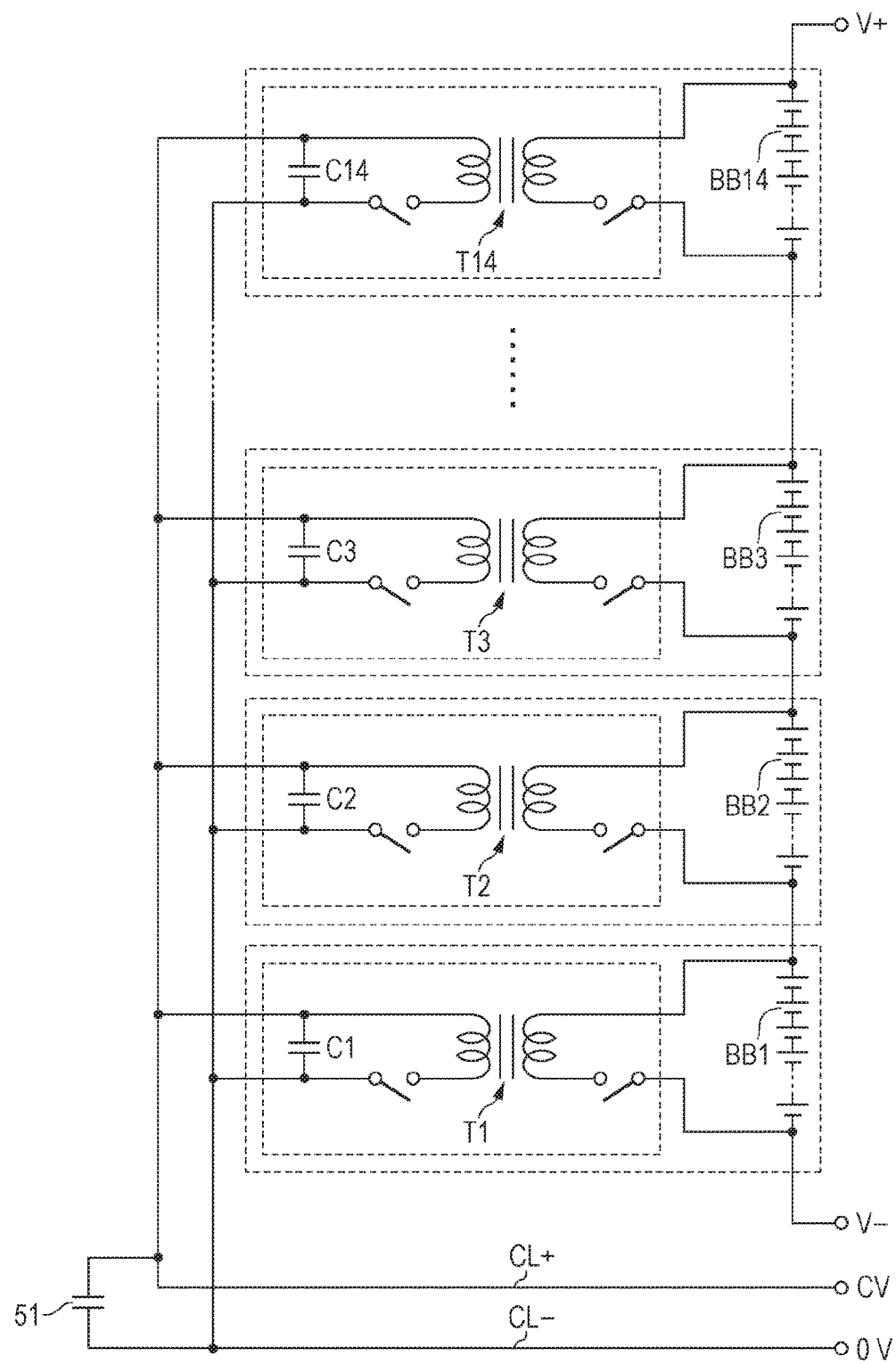
FIG. 25 is a connection diagram of a second example of the inter-module balance circuit according to an embodiment of the present disclosure.

As illustrated in FIG. 25, with the secondary side of each of the flyback transformers T1 through T14 of each electric storage module, capacitors C1 through C14 are inserted between the common power supply line CL+ and the common power supply line CL−, respectively. High-frequency components are reduced by the capacitors C1 through C14, whereby voltage generated at the common power supply lines CL+ and CL− can be output as DC power supply. This DC power supply may be supplied as a power source of the control box ICNT.

Figure 26:
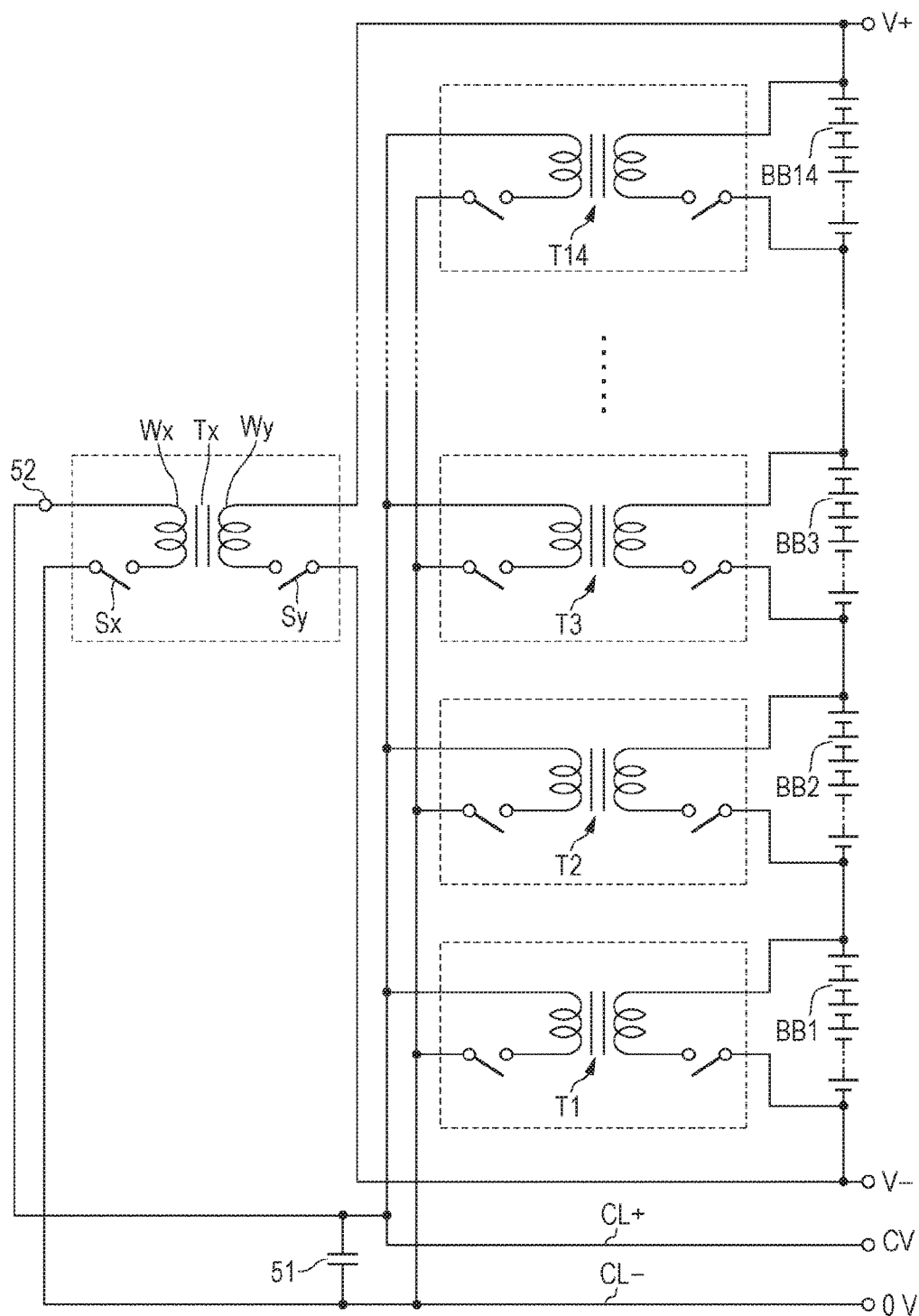
FIG. 26 is a connection diagram of a third example of the inter-module balance circuit according to an embodiment of the present disclosure.

Further, as illustrated in FIG. 26, a flyback transformer Tx may be provided common to all of the electric storage modules. The flyback transformer Tx is made up of a primary side coil Wy, a secondary side coil Wx, and a magnetic core Tx. The coil Wx and a switch Sx are serially connected. The coil Wy and a switch Sy are serially connected. One edge of the secondary side coil Wx of the flyback transformer Tx is connected to a terminal 52, and the other edge thereof is connected to a 0-V line via the switch Sx. The terminal 52 is connected to a common power supply voltage CV terminal.

One edge of the primary side Wy is connected to the positive side (V+) of the series connection of the multiple, e.g., 14 battery block groups BB1 through BB14 of an electric storage module. The other edge of the primary side coil Wy is connected to the negative side (V−) of the series connection of the battery block groups BB1 through BB14. The flyback transformers T1 through T14 and the electric storage element 51 are connected to the battery block groups BB1 through BB14 in the same way as with the configuration in FIG. 21, and balance control between modules as described above is performed.

According to the configuration illustrated in FIG. 26, electric power can be supplied to the battery block groups of all of the electric storage modules through the flyback transformer TX at once, and variations as to the operation of balance control between modules can be increased.

Further, with the present disclosure, there can be employed an electric power transmission apparatus employing an electromagnetic coupling method such as a forward converter method, RCC (Ringing Choke Converter) method, or the like other than a flyback converter method.

Figure 27:
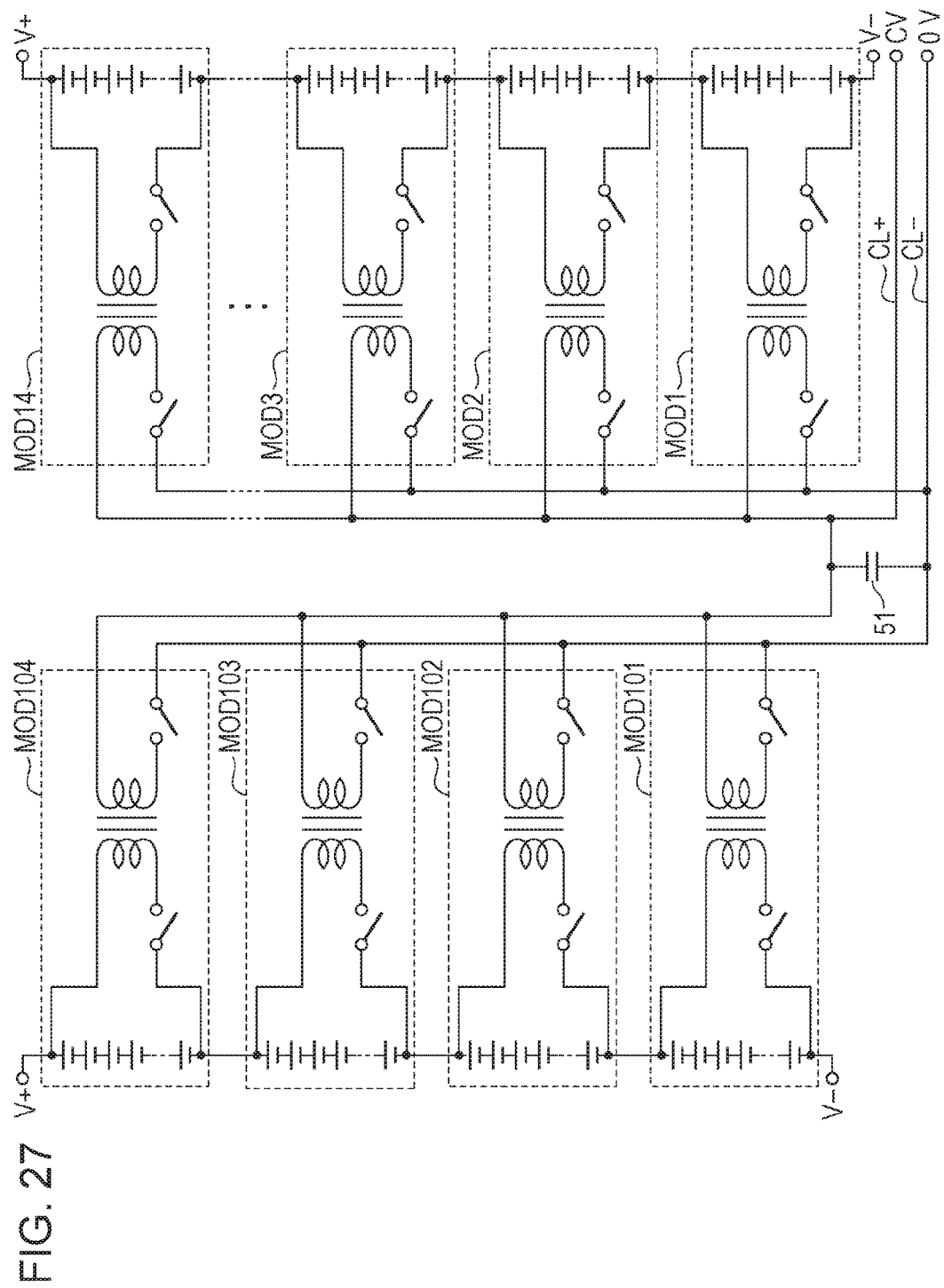
FIG. 27 is a connection diagram of a fourth example of the inter-module balance circuit according to an embodiment of the present disclosure.

FIG. 27 illustrates an application of the present disclosure, wherein another electric storage system made up of elect storage modules MOD101 through MOD104 is connected to the electric storage modules MOD1 through MOD14 (configuration illustrated in FIG. 21). The common power supply lines CL+ and CL− can be connected to another electric storage system if there is a relation wherein the common power supply voltage CV is common between two electric storage systems. That is to say, the number of electric storage modules to be connected can readily be increased.

Figure 28:
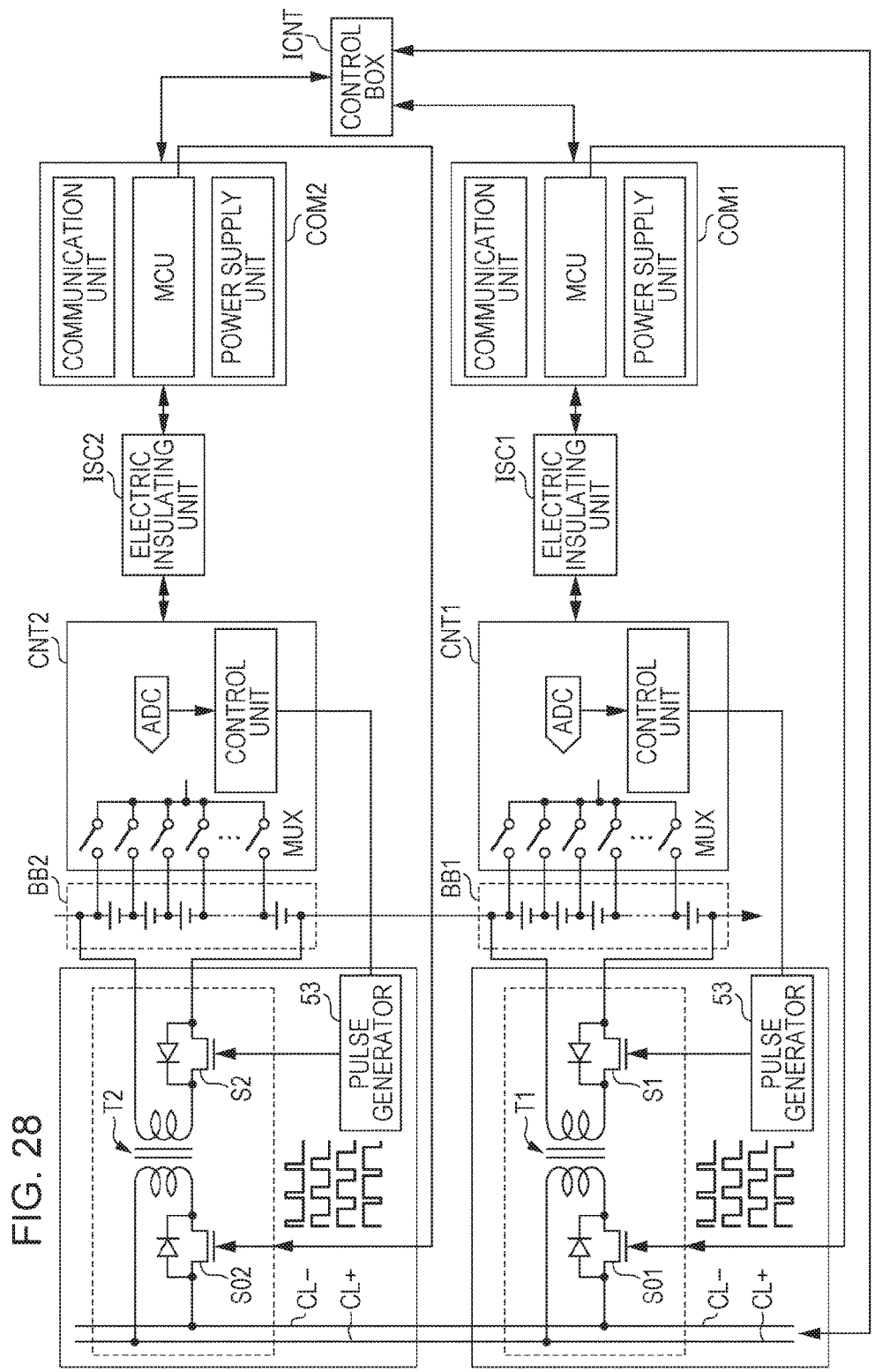
FIG. 28 is a block diagram of an example of an electric storage system including the inter-module balance circuit according to an embodiment of the present disclosure.

FIG. 28 illustrates an example of the entire configuration of an electric storage system made up of electric storage modules, e.g., electric storage modules MOD1 and MOD2. Control pulses as to the primary side switches (MOSFET) S1 and S2 of the flyback transformer T1 of the above inter-module balance control circuit are supplied from pulse generators 53, respectively. The pulse generators 53 generate control pulses according to the control signals from the control units of the module controllers CNT1 and CNT2, respectively. For example, the pulse generator 53 outputs a control pulse subjected to pulse width modulation. Control pulses as to the secondary side switches (MOSFET) S01 and S02 of the flyback transformers T1 and T2 are supplied from MCUs (MicroController Unit) within communication units COM1 and COM2, respectively.

The control box ICNT determines sequence of balance between modules from the voltage information of each module. The control box ICNT individually informs presence/absence of charging/discharging of balance between modules to the MCUs within the communication units COM1 and COM2 of the modules. Each MCU directly supplies a control signal to the secondary side of each flyback transformer, or informs a control signal to the primary side of each flyback transformer by insulating communication via an insulating unit ISC.

The reason why a control signal is supplied from a separate circuit block depending on the primary side and secondary side is because there is difference between the levels of control signals. Also, in parallel with the above operation, the control box ICNT measures voltage between the power supply lines CL+ and CL− from which the common power supply voltage CV is supplied, and performs the entire control of balance between modules so as to obtain the desired common power supply voltage CV.

Advantages of Electric Storage Apparatus According to Present Disclosure

With the inter-module balance circuit according to an embodiment of the present disclosure, the flyback transformers of each module are separately configured, which differs from a configuration wherein the magnetic core is shared, whereby wiring can readily be performed without performing star-shaped wiring.

With the inter-module balance circuit according to an embodiment of the present disclosure, voltages of both edges of the battery block groups of each electric storage module are applied to the primary side coils and switches of flyback transformers, and the common power supply voltage CV is applied to the secondary coils and switches. The common power supply voltage CV is taken as a value equal to the voltages of both edges of the battery block groups of each electric storage module. Accordingly, the voltage of the series connection of all of the electric storage modules is not applied to coils and switches, and accordingly, lower voltage withstanding components can be employed as coils and switches, which is an advantage.

With the present disclosure, the primary side switches S1 through S14 and the secondary side switches S01 through S14 of flyback transformers can be controlled by an independent control pulse signal. Accordingly, transmission of electric power can be performed via multiple desired flyback transformers. Further, the length of an on period of a switching operation is set, whereby electric power amount to be moved via flyback transformers can individually be controlled. That is to say, a period for turning on a switch is lengthened according to electric power amount to be moved, whereby the electric power amount to be moved can be varied.

Further, large current flows between the output terminals V+ and V− of multiple electric storage modules, and accordingly, relatively large noise tends to occur. However, the common power supply voltage CV is insulated from the output terminals V+ and V−, whereby influence of noise due to variation in load current can be reduced.

The common power supply voltage CV having little influence of noise can be employed as a power source of the control box ICNT. For example, the value of the common power supply voltage CV may be the same value as the power supply voltage of the control unit (+5 V, +12 V, or the like). In the event of employing the common power supply voltage CV as a power source of the control box ICNT, the power source of the control box ICNT can be prevented from receiving influence of voltage variation of electric storage modules.

Though the above description is in the case that the present disclosure has been applied to an inter-module balance circuit, the present disclosure can be applied to balance between cells. Specifically, with the above configuration illustrated in FIG. 21, the battery block groups BB1 through BB14 are replaced with battery cells respectively, whereby an inter-cell balance circuit can be realized. Even in the event of applying the present disclosure to the inter-cell balance circuit, the same advantages as with the above inter-module balance circuit are obtained.

Figure 29:
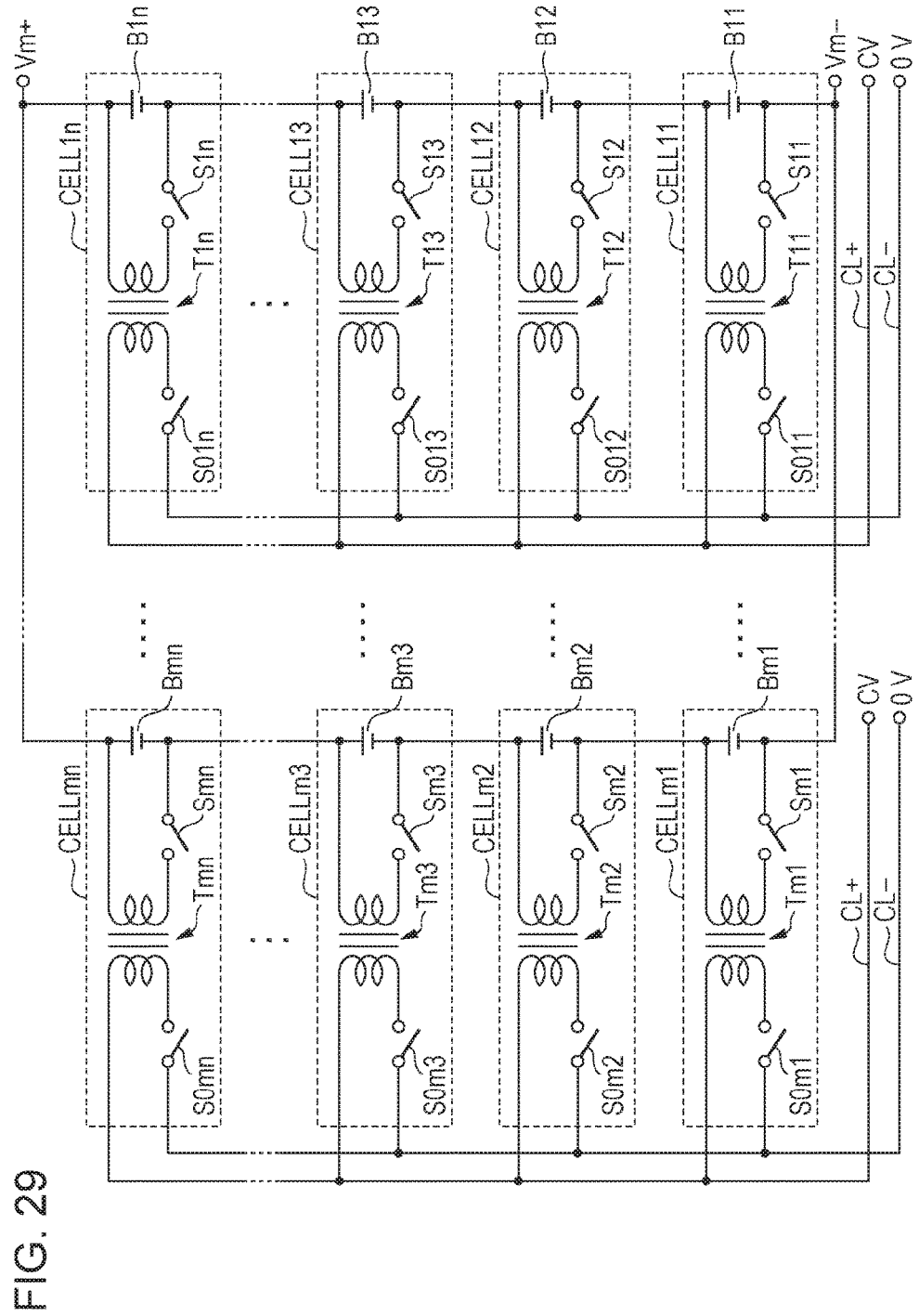
FIG. 29 is a connection diagram in the case that the present disclosure has been applied to an inter-cell balance circuit.

As illustrated in FIG. 29 as a common configuration, the present disclosure can be applied to an inter-cell balance circuit. In FIG. 29, n battery cells B11 through B1n are serially connected, and further, m series connections of battery cells are connected in parallel. The primary side coils of flyback transformers T11 through T1n, . . . , Tm1 through Tmn are connected to the battery cells in parallel, and primary side switches S11 through S1n, . . . , Sm1 through Smn are serially connected to the primary side coils. One edges of the secondary side coils of the flyback transformers are connected to the power supply line CL+ of the common power supply voltage CV, and the other edges of the secondary side coils are connected to the power supply line CL− of the common power supply voltage CV serially via the secondary side switches S011 through S01n, . . . , S0m1 through S0mn, respectively.

Note that the present disclosure can also have the following configurations.

In one embodiment, a battery system includes: a plurality of electronic storage modules serially connected together, each electronic storage module including a battery block group including a plurality of battery cells, and a different magnetic core connected to each battery block group.

In an embodiment, each electronic storage module is provided in a separate housing, and wherein a plurality of sub modules are provided in each housing, and a plurality of battery block groups are provided in each of the sub modules.

In an embodiment, each electronic storage module includes a module controller configured to individually control charging and discharging of the respective battery block group.

In an embodiment, each of the module controllers are connected through a bus to a common control device.

In an embodiment, the module controllers are configured to initiate a switching operation to control a length of an on-period for charging or discharging of the respective battery block group.

In an embodiment, each of the storage modules further comprise a flyback transformer configured as a coupling inductor, the flyback transformers each including: a different one of the magnetic cores; a primary side coil connected to the magnetic core; and a secondary side coil connected to the magnetic core, wherein a primary switch is serially connected to the primary side coil and to the respective battery block group, and wherein a secondary switch is serially connected to the secondary side coil.

In an embodiment, each electronic storage module includes a module controller configured to individually control charging and discharging of the respective battery block group by controlling the primary side switches and the secondary side switches of the respective flyback transformer through control pulse signals.

In an embodiment, for each of the storage modules, the secondary switch is connected to a common positive power supply line and a common negative power supply line.

In an embodiment, an energy storage device is inserted between the common positive power supply line and the common negative power supply line.

In an embodiment, the energy storage device is a capacitor.

In an embodiment, for each of the storage modules, the secondary side coil is connected to a common positive power supply line and a common negative power supply line.

In an embodiment, an energy storage device is inserted between the common positive power supply line and the common negative power supply line.

In an embodiment, the energy storage device is a capacitor.

In another embodiment, a battery device includes: an electric storage module including a battery block group including a plurality of battery cells, and a magnetic core connected to the battery block group and configured to operate with only the one battery block group.

In an embodiment, the electronic storage module is provided in a housing, and wherein a plurality of sub modules are provided in the housing, and a plurality of battery block groups are provided in each of the sub modules.

In an embodiment, the electronic storage module includes a module controller configured to control charging and discharging of the battery block group.

In an embodiment, the module controller is configured to initiate a switching operation to control a length of an on-period for charging or discharging of the battery block group.

In an embodiment, the storage module further comprises a flyback transformer configured as a coupling inductor, the flyback transformer including: the magnetic core; a primary side coil connected to the magnetic core; and a secondary side coil connected to the magnetic core, wherein a primary switch is serially connected to the primary side coil and to the battery block group, and wherein a secondary switch is serially connected to the secondary side coil.

In an embodiment, the electronic storage module includes a module controller configured to control charging and discharging of the battery block group by controlling the primary side switches and the secondary side switches of the flyback transformer through control pulse signals.

In an embodiment, the secondary switch is connected to a common positive power supply line and a common negative power supply line.

In an embodiment, an energy storage device is inserted between the common positive power supply line and the common negative power supply line.

In an embodiment, the energy storage device is a capacitor.

In an embodiment, the secondary side coil is connected to a common positive power supply line and a common negative power supply line.

In an embodiment, an energy storage device is inserted between the common positive power supply line and the common negative power supply line.

In an embodiment, the energy storage device is a capacitor.

In another embodiment a control device includes: an electric storage module including a magnetic core, a primary switch electrically connected to the magnetic core via a primary side coil, a secondary switch electrically connected to the magnetic core via a secondary side coil, and a module controller.

In an embodiment, the electronic storage module is provided in a housing, and a plurality of battery block groups are provided in each of the sub modules, each battery block group including a plurality of battery cells.

In an embodiment, the module controller is configured to control charging and discharging of a battery block group that is connected to the magnetic core.

In an embodiment, the module controller is connected through a bus to a common control device.

In an embodiment, the module controller is configured to initiate a switching operation to control a length of an on-period for charging or discharging of the respective battery block group.

In an embodiment, the module controller is configured to control charging and discharging of the battery block group by controlling the primary side switches and the secondary side switches through control pulse signals.

In an embodiment, for the storage module, the secondary switch is connected to a common positive power supply line and a common negative power supply line.

In an embodiment, an energy storage device is inserted between the common positive power supply line and the common negative power supply line.

In an embodiment, the energy storage device is a capacitor.

In an embodiment, for the storage module, the secondary side coil is connected to a common positive power supply line and a common negative power supply line.

In an embodiment, an energy storage device is inserted between the common positive power supply line and the common negative power supply line.

In an embodiment, the energy storage device is a capacitor.

In another embodiment, an electric vehicle includes: battery system including a plurality of electronic storage modules serially connected together, each electronic storage module including a battery block group including a plurality of battery cells, and a different magnetic core connected to each battery block group; and a converter configured to receive a supply of electric power from the battery system, and to supply the power to a component of the electric vehicle.

In an embodiment, each electronic storage module is provided in a separate housing, and wherein a plurality of sub modules are provided in each housing, and a plurality of battery block groups are provided in each of the sub modules.

In an embodiment, each electronic storage module includes a module controller configured to individually control charging and discharging of the respective battery block group.

In an embodiment, each of the module controllers are connected through a bus to a common control device.

In an embodiment, the module controllers are configured to initiate a switching operation to control a length of an on-period for charging or discharging of the respective battery block group.

In an embodiment, each of the storage modules further comprise a flyback transformer configured as a coupling inductor, the flyback transformers each including: a different one of the magnetic cores; a primary side coil connected to the magnetic core; and a secondary side coil connected to the magnetic core, wherein a primary switch is serially connected to the primary side coil and to the respective battery block group, and wherein a secondary switch is serially connected to the secondary side coil.

In an embodiment, each electronic storage module includes a module controller configured to individually control charging and discharging of the respective battery block group by controlling the primary side switches and the secondary side switches of the respective flyback transformer through control pulse signals.

In an embodiment, for each of the storage modules, the secondary switch is connected to a common positive power supply line and a common negative power supply line.

In an embodiment, an energy storage device is inserted between the common positive power supply line and the common negative power supply line.

In an embodiment, the energy storage device is a capacitor.

In an embodiment, for each of the storage modules, the secondary side coil is connected to a common positive power supply line and a common negative power supply line.

In an embodiment, an energy storage device is inserted between the common positive power supply line and the common negative power supply line.

In an embodiment, the energy storage device is a capacitor.

Electric Storage System in House Serving as Application

Figure 30:
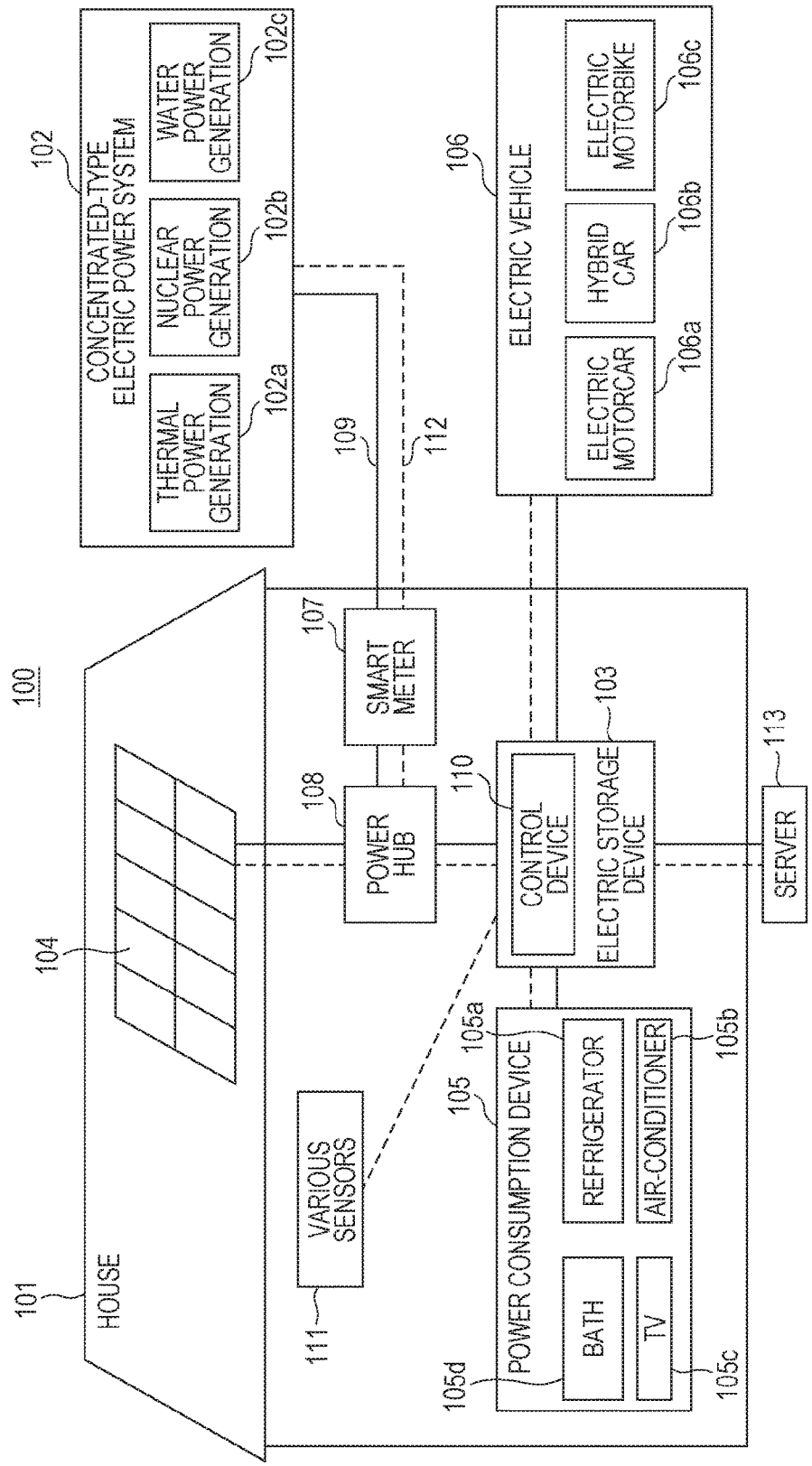
FIG. 30 is a block diagram of a first example of an application of the electric storage system including the inter-module balance circuit according to an embodiment of the present disclosure.

Description will be made regarding an example wherein the present disclosure has been applied to a residential electric storage system, with reference to FIG. 30. For example, with an electric storage system 100 for a residence 101, electric power is supplied from a concentrated-type electric power system 102 such as thermal power generation 102a, nuclear power generation 102b, water power generation 102c, or the like to an electric storage apparatus 103 via an electric power network 109, an information network 112, a smart meter 107, a power hub 108, or the like. In addition to this, electric power is supplied from an independent power source such as a domestic power generating apparatus 104 or the like to the electric storage apparatus 103. The electric power supplied from the electric storage apparatus 103 is accumulated. Electric power to be used at the residence 101 is fed using the electric storage apparatus 103. The same electric storage system can also be used not only for the residence 101 but also for buildings.

At the residence 101, there are provided a power generating apparatus 104, power consumption devices 105, an electric storage apparatus 103, a control device 110 for controlling the devices, a smart meter 107, and various sensors 111 for obtaining various types of information. The devices are connected by an electric power network 109 and an information network 112. Solar batteries, fuel cells, or the like are used as the power generating apparatus 104, and generated electric power is supplied to the power consumption device 105 and/or electric storage apparatus 103. The power consumption device 105 is a refrigerator 105a, an air-conditioner 105b, a television receiver 105c, a bath 105d, or the like. Further, an electric vehicle 106 is included in the power consumption device 105. The electric vehicle 106 is an electric motorcar 106a, a hybrid car 106b, or an electric motorbike 106c.

The above battery units according to an embodiment of the present disclosure are applied to the electric storage apparatus 103. The electric storage apparatus 103 is configured of secondary batteries or capacitors. For example, the electric storage apparatus 103 is configured of lithium-ion batteries. The lithium-ion batteries may be a fixed type or may be used for the electric vehicle 106. The smart meter 107 has a function for measuring the use amount of commercial power, and transmitting the measured use amount to an electric power company. The electric power network 109 may be any one of or a combination of two or more of DC electric supply, AC electric supply, and non-contact electric supply.

Examples of the various sensors 111 include a human detection sensor, an illuminance sensor, an object detection sensor, a power consumption sensor, a sway sensor, a contact sensor, a temperature sensor, and an infrared sensor. The information obtained by the various sensors 111 is transmitted to the control device 110. According to the information from the sensors 111, the state of the weather, a people's condition, and so forth are recognized, and accordingly, energy consumption can be minimized by automatically controlling the power consumption device 105. Further, the control device 110 can transmit information relating to the residence 101 to an external electric power company or the like via the Internet.

Processing such as branching of the power line, DC-AC conversion, or the like is performed by the power hub 108. As for a communication method of the information network 112 to be connected to the control device 110, there are a method using a communication interface such as UART (Universal Asynchronous Receiver-Transceiver: asynchronous serial communication transmission/reception circuit) or the like, and a method using a sensor network according to the wireless communication standard such as Bluetooth, ZigBee, Wi-Fi, or the like. The Bluetooth method is applied to multimedia communication, and one-to-many connection communication can be performed. ZigBee uses IEEE (Institute of Electrical and Electronics Engineers) 802.15.4 physical layer. IEEE802.15.4 is a name of short distance wireless network standard called PAN (Personal Area Network) or W (Wireless) PAN.

The control device 110 is connected to an external server 113. This server 113 may be managed by any of the residence 101, an electric power company, and a service provider. Information that the server 113 transmits/receives is, for example, consumption power information, life pattern information, power charges, weather information, natural disaster information, or information relating to power transactions. These information may be transmitted/received from a power consumption device within the home (e.g., television receiver), or may be transmitted/received from a power consumption device outside the home (e.g., cellular phone). These information may be displayed on a device having a display function, e.g., a television receiver, a cellular phone, a PDA (Personal Digital Assistants), or the like.

The control device 110 which controls the units is configured of a CPU (Central Processing Unit), RAM (Random Access Memory), ROM (Read Only Memory), and so forth. With this example, the control device 110 is housed in the electric storage apparatus 103. The control device 110 is connected to the electric storage apparatus 103, domestic power generating apparatus 104, power consumption device 105, various sensors 111, and server 113 by the information network 112, and has a function for adjusting, for example, the use amount of commercial power, and production of electricity. Note that, in addition to this, the control device 110 may have a function for performing power transactions at an electricity market, or the like.

As described above, not only the concentrated-type electric power system 102 such as the thermal power 102a, nuclear power 102b, water power 102c, and so forth but also the generated power of the domestic power generating apparatus 104 (solar power generating, wind power generating) can be accumulated in the electric storage apparatus 103. Accordingly, even though the generated power of the domestic power generating apparatus 104 fluctuates, control can be performed such as stabilizing of power amount to be externally transmitted, or discharging as appropriate. For example, usage is also available such that the electric power obtained by solar power generation is accumulated in the electric storage apparatus 103, and also midnight power with reasonable nightly rates is accumulated in the electric storage apparatus 103, and the electric power accumulated by the electric storage apparatus 103 is discharged and used at a time zone of daytime with high rates.

Note that, with this example, though description has been made regarding an example wherein the control device 110 is housed in the electric storage apparatus 103, the control device 110 may be housed in the smart meter 107 or may be configured in a standalone manner. Further, the electric storage system 100 may be used with multiple homes in a residential condominium as an object, or may be used with multiple detached houses as an object.

Electric Storage System in Vehicle as Application

Figure 31:
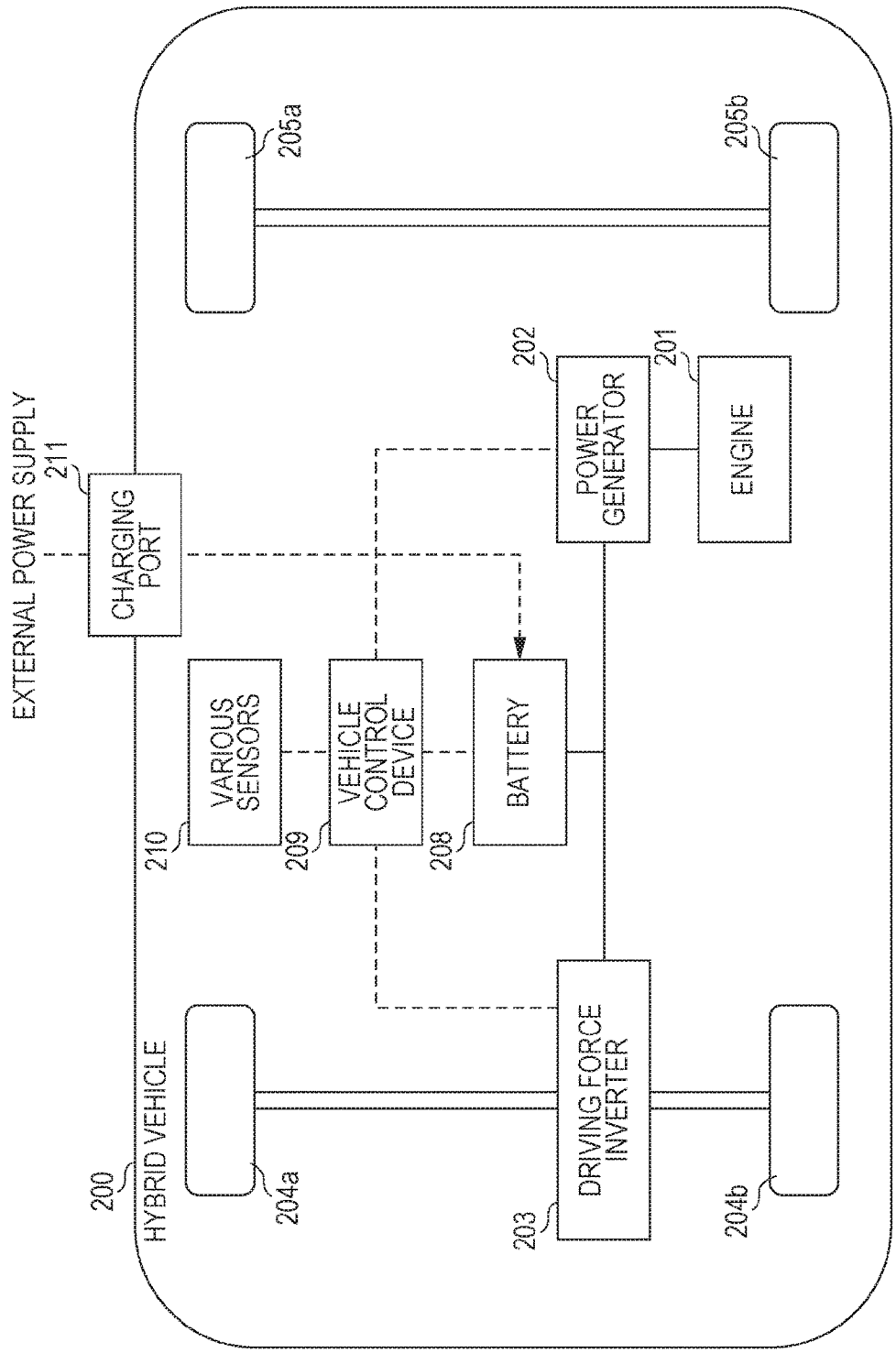
FIG. 31 is a block diagram of a second example of an application of the electric storage system including the inter-module balance circuit according to an embodiment of the present disclosure.

Description will be made regarding an example wherein the present disclosure has been applied to an electric storage system for vehicle, with reference to FIG. 31. FIG. 31 schematically illustrates an example of the configuration of a hybrid vehicle employing a series hybrid system to which the present disclosure has been applied. The series hybrid system is a vehicle which drives with a power driving force inverter by using electric power generated at a power generator which is operated by an engine, or the electric power thereof temporarily pulled in a battery.

There are mounted on this hybrid vehicle 200 an engine 201, a power generator 202, a power driving force inverter 203, a driving wheel 204*a*, a driving wheel 204*b*, a wheel 205*a*, a wheel 205*b*, a battery 208, a vehicle control device 209, various sensors 210, and a charging port 211. The above battery unit according to an embodiment of the present disclosure is applied to the battery 208.

The hybrid vehicle 200 drives with the power driving force inverter 203 as a driving source. An example of the power driving force inverter 203 is a motor. The power driving force inverter 203 is activated by the electric power of the battery 208, and the torque of this power driving force inverter 203 is propagated to the driving wheels 204*a* and 204*b*. Note that direct current to alternate current (DC-AC) or inverse transform (AC-DC conversion) is employed at an appropriate portion, whereby the power driving force inverter 203 can be applied to either a AC motor or a DC motor. The various sensors 210 controls the number of revolutions of the engine via the vehicle control device 209, or controls the opening of an unshown throttle valve (throttle opening angle). The various sensors 210 include a velocity sensor, an acceleration sensor, a number-of-revolutions-of-engine sensor, and so forth.

The torque of the engine 201 is propagated to the power generator 202, and the electric power generated at the power generator 202 can be accumulated in the battery 208 by this torque.

In the event that the hybrid vehicle has been decelerated by an unshown brake mechanism, the resistance force at the time of deceleration thereof is applied to the power driving force inverter 203 as torque, and the regenerative power generated at the power driving force inverter 203 is accumulated in the battery 208 by this torque.

The battery 208 is connected to an external power source of the hybrid vehicle, whereby the battery 208 can receive power supply from the external power source thereof with the charging port 211 as an input control port, and accumulate the received electric power.

Though not illustrated in the drawing, there may be provided an information processing device which performs information processing relating to vehicle control based on information relating to secondary batteries. Examples of such an information processing device include an information processing device which performs battery remaining capacity display based on information relating to battery remaining capacity.

Note that description has been made so far regarding the series hybrid vehicle which uses electric power generated at the power generator which operates the engine, or the electric power thereof being temporally pulled in the battery, and drives with the motor, as an example. However, the present disclosure can effectively be applied to a parallel hybrid vehicle which takes both engine output and motor output as driving sources, and switches and uses three methods of driving by the engine alone, driving by the motor alone, and driving by the engine and motor as appropriate. Further, the present disclosure can effectively be applied to an electric motorcar which drives by driving according to the driving motor alone without using the engine.

Modification

Though the embodiments of the present disclosure have specifically been described so far, the present disclosure is not restricted to the above embodiments, and various modifications based on the technical idea of the present disclosure can be made. For example, the configurations, methods, processes, shapes, materials, numeric values, and so forth described in the above embodiments are only examples, and configurations, methods, processes, shapes, materials, numeric values, and so forth different from the above may be employed as appropriate.

Also, the configurations, methods, processes, shapes, materials, numeric values, and so forth described in the above embodiments can mutually be combined without departing from the scope of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A battery system comprising:
   a common power source and a plurality of electronic storage modules serially connected together, each electronic storage module including
   a battery block group including a plurality of battery cells, and
   a magnetic core connected to the battery block group,
   wherein the magnetic core in each electronic storage module includes a primary side coil connected to a primary switch and the battery block group, and a secondary side coil connected to a secondary switch, a common positive power supply line and a common negative power supply line, and the magnetic core in each electronic storage module is separate from each other,
   wherein the common positive power supply line connects to at least two secondary side coils, and
   wherein the common power source is connected between the common positive power supply line and the common negative power supply line, and the common power source is configured to supply electric power to the battery cells via the secondary switch, the secondary side coil, the primary side coil and the primary switch.

2. The battery system according to claim 1, further comprising a module controller, and wherein the common power source is configured to supply electric power to the module controller.

3. The battery system according to claim 2, wherein the module controller is configured to control charging and discharging of the battery block group.

4. The battery system according to claim 2, wherein the module controller is connected through a bus to a common control device.

5. The battery system according to claim 2, wherein the module controller is configured to initiate a switching operation to control a length of an on-period for charging or discharging of the battery block group.

6. The battery system according to claim 1, wherein each electronic storage module further comprises a flyback transformer configured as a coupling inductor,
   wherein the primary switch is serially connected to the primary side coil, and
   wherein the secondary switch is serially connected to the secondary side coil.

7. The battery system according to claim 6, wherein each electronic storage module includes a module controller configured to control charging and discharging of a respective battery block group by controlling the primary switch and the secondary switch of a respective flyback transformer through control pulse signals.

8. The battery system according to claim 7, wherein the common power source is a capacitor.

9. The battery system according to claim 1, wherein each electronic storage module is provided in a separate housing.

10. The battery system according to claim 1, wherein the common power source is a capacitor.

11. The battery system according to claim 1, wherein the common power source is configured to provide a common power voltage which is less than a voltage withstanding of the secondary switch.

12. A battery system comprising:
a common power source, a module controller and a plurality of electronic storage modules serially connected together, each electronic storage module including
a battery block group including a plurality of battery cells, and
a magnetic core connected to the battery block group,
wherein the magnetic core in each electronic storage module includes a primary side coil connected to a primary switch and the battery block group, and a secondary side coil connected to a secondary switch, a common positive power supply line and a common negative power supply line, and the magnetic core in each electronic storage module is separate from each other,
wherein the common positive power supply line connects to at least two secondary side coils, and
wherein the common power source is connected between the common positive power supply line and the common negative power supply line, and the common power source is configured to supply electric power to the module controller.

13. The battery system according to claim 12, wherein each electronic storage module is provided in a separate housing.

14. The battery system according to claim 12, wherein the module controller is configured to control charging and discharging of the battery block group.

15. The battery system according to claim 12, wherein the module controller is connected through a bus to a common control device.

16. The battery system according to claim 12, wherein the module controller is configured to initiate a switching operation to control a length of an on-period for charging or discharging of the battery block group.

17. The battery system according to claim 12, wherein each electronic storage module further comprises a flyback transformer configured as a coupling inductor,
wherein the primary switch is serially connected to the primary side coil, and
wherein the secondary switch is serially connected to the secondary side coil.

18. The battery system according to claim 17, wherein each electronic storage module includes a module controller configured to control charging and discharging of a respective battery block group by controlling the primary switch and the secondary switch of a respective flyback transformer through control pulse signals.

19. The battery system according to claim 12, wherein the common power source is a capacitor.

20. The battery system according to claim 12, wherein the common power source is configured to provide a common power voltage which is less than a voltage withstanding of the secondary switch.

* * * * *